(12) United States Patent
Wheatley

(10) Patent No.: US 10,641,901 B2
(45) Date of Patent: May 5, 2020

(54) AUTONOMOUS SATELLITE AUTOMATIC GAIN CONTROL

(71) Applicant: QUALCOMM Incorporated, San Diego, CA (US)

(72) Inventor: Charles Edward Wheatley, Del Mar, CA (US)

(73) Assignee: QUALCOMM Incorporated, San Diego, CA (US)

(*) Notice: Subject to any disclaimer, the term of this patent is extended or adjusted under 35 U.S.C. 154(b) by 401 days.

(21) Appl. No.: 14/864,814

(22) Filed: Sep. 24, 2015

(65) Prior Publication Data
US 2016/0274240 A1 Sep. 22, 2016

Related U.S. Application Data

(60) Provisional application No. 62/136,170, filed on Mar. 20, 2015.

(51) Int. Cl.
*G01S 19/02* (2010.01)
*H04B 7/185* (2006.01)

(52) U.S. Cl.
CPC .......... *G01S 19/02* (2013.01); *H04B 7/18543* (2013.01)

(58) Field of Classification Search
CPC . G01S 19/02; H04B 7/18543; H04B 7/18515; H04B 7/18534; H04B 7/8563;
(Continued)

(56) References Cited

U.S. PATENT DOCUMENTS 3,974,448 A * 8/1976 Baum ............... H04B 3/141
455/13.1
4,261,054 A * 4/1981 Scharla-Nielsen ..................
H04B 7/18543
342/353

(Continued)

FOREIGN PATENT DOCUMENTS

CN 1262823 A 8/2000
CN 102096079 A 6/2011
(Continued)

OTHER PUBLICATIONS

International Search Report and Written Opinion—PCT/US2016/020520—ISA/EPO—dated Jun. 7, 2016.

*Primary Examiner* — Vladimir Magloire
*Assistant Examiner* — Nuzhat Pervin
(74) *Attorney, Agent, or Firm* — Paradice and Li LLP

(57) ABSTRACT

A method and apparatus for addressing reductions in the uplink path gain associated with user terminals are disclosed. A return path of the satellite may receive a number of data signals on a single frequency channel, wherein each of the number of data signals occupies a unique time-frequency sub-channel of the single frequency channel, originates from a corresponding one of a number of user terminals (UTs), and includes a plurality of time slots dynamically allocated to a group of user equipment (UE) devices associated with the corresponding UT. The return path may determine a combined power level of all the number of received data signals that occupy all the time-frequency sub-channels of the single frequency channel, and then adjust an amplifier gain applied to the number of received data signals in the return path based, at least in part, on the combined power level.

30 Claims, 12 Drawing Sheets

(58) Field of Classification Search
CPC ..... H04B 7/026; H04B 7/0452; H04W 52/08; H04W 36/385; H04W 36/0055; H04L 5/0007; H04L 5/0046; H04L 1/0003; H04L 27/0008; H04L 1/0021; H04J 11/00; H03F 3/217
USPC .................................................. 342/357.395
See application file for complete search history.

(56) References Cited

U.S. PATENT DOCUMENTS

| | | | | |
|---|---|---|---|---|
| 4,752,967 | A * | 6/1988 | Bustamante | H04B 7/18513 455/10 |
| 5,596,494 | A * | 1/1997 | Kuo | G01C 11/02 348/144 |
| 5,678,198 | A * | 10/1997 | Lemson | H03G 3/3084 370/202 |
| 5,687,195 | A * | 11/1997 | Hwang | H03G 3/001 375/345 |
| 5,749,549 | A * | 5/1998 | Ashjaee | F16M 11/14 248/168 |
| 5,757,315 | A * | 5/1998 | Aoki | G01C 21/20 342/357.31 |
| 5,769,370 | A * | 6/1998 | Ashjaee | F16M 11/14 248/168 |
| 5,924,015 | A * | 7/1999 | Garrison | H04B 7/18543 455/13.4 |
| 6,366,776 | B1 * | 4/2002 | Wright | H04B 7/18513 370/347 |
| 6,567,645 | B1 * | 5/2003 | Wiedeman | H04B 7/18534 455/12.1 |
| 6,859,652 | B2 * | 2/2005 | Karabinis | H04B 7/18563 455/427 |
| 7,508,798 | B2 * | 3/2009 | Tong | H04B 7/026 370/337 |
| 7,843,863 | B2 * | 11/2010 | Willenegger | H04W 52/08 370/311 |
| 7,869,410 | B2 * | 1/2011 | Anderson | H04B 7/18543 370/335 |
| 9,036,570 | B2 * | 5/2015 | Vrzic | H04W 36/385 370/329 |
| 10,320,064 | B2 * | 6/2019 | Vaddiparty | H01Q 1/288 |
| 2004/0258134 | A1 * | 12/2004 | Cho | H04L 5/0046 375/131 |
| 2004/0259497 | A1 * | 12/2004 | Dent | H04B 7/18515 455/13.3 |
| 2006/0176093 | A1 * | 8/2006 | Song | H03G 3/3063 327/179 |
| 2007/0120596 | A1 * | 5/2007 | Oh | H03F 3/217 330/10 |
| 2007/0140208 | A1 * | 6/2007 | Varikat | H04B 7/026 370/345 |
| 2007/0171808 | A1 * | 7/2007 | Wu | H04B 7/0452 370/208 |
| 2008/0076438 | A1 * | 3/2008 | Chang | H04L 1/0003 455/452.2 |
| 2008/0095248 | A1 * | 4/2008 | Helfenstein | H04L 27/0008 375/256 |
| 2008/0129374 | A1 * | 6/2008 | Zhou | H03F 1/32 330/2 |
| 2009/0110087 | A1 * | 4/2009 | Liu | H04L 1/0021 375/260 |
| 2009/0196215 | A1 | 8/2009 | Sabat et al. | |
| 2010/0272219 | A1 * | 10/2010 | Andgart | H03G 3/3052 375/345 |
| 2010/0296385 | A1 * | 11/2010 | Li | H04L 5/0007 370/210 |
| 2011/0032973 | A1 * | 2/2011 | To | H04J 11/00 375/141 |
| 2011/0189947 | A1 * | 8/2011 | Miller | H04B 7/18515 455/12.1 |
| 2011/0211462 | A1 * | 9/2011 | Wu | H04B 7/0452 370/248 |
| 2012/0039290 | A1 * | 2/2012 | Vrzic | H04W 36/385 370/329 |
| 2014/0010267 | A1 * | 1/2014 | Jacob | H04L 1/20 375/219 |
| 2014/0232859 | A1 * | 8/2014 | Kotzur | G01C 1/04 348/135 |
| 2014/0266875 | A1 * | 9/2014 | Cameron | B66C 13/46 342/357.36 |
| 2014/0278076 | A1 * | 9/2014 | Conquest | B66C 13/46 701/468 |
| 2014/0278078 | A1 * | 9/2014 | Cameron | B66C 13/46 701/480 |
| 2016/0234855 | A1 * | 8/2016 | Panteleev | H04W 48/06 |

FOREIGN PATENT DOCUMENTS

| | | | |
|---|---|---|---|
| CN | 102740431 A | 10/2012 | |
| CN | 103703683 A | 4/2014 | |
| EP | 0969606 A2 * | 1/2000 | ......... H04B 7/18543 |
| EP | 2273693 A2 * | 1/2011 | ......... H04B 7/18513 |
| EP | 2367291 A1 | 9/2011 | |
| JP | S5710547 A | 1/1982 | |
| JP | S61195028 A | 8/1986 | |
| JP | S63190434 A | 8/1988 | |
| JP | H1098425 A | 4/1998 | |
| JP | 2002033692 A | 1/2002 | |
| WO | WO-9918678 A1 | 4/1999 | |
| WO | WO-2006006320 A1 | 1/2006 | |

* cited by examiner

AUTONOMOUS SATELLITE AUTOMATIC GAIN CONTROL

CROSS-REFERENCE TO RELATED APPLICATIONS

This application claims priority under 35 U.S.C. 119(e) to co-pending and commonly owned U.S. Provisional Patent Application No. 62/136,170 entitled "AUTONOMOUS SATELLITE AUTOMATIC GAIN CONTROL" filed on Mar. 20, 2015, the entirety of which is incorporated by reference herein.

INTRODUCTION

Various aspects described herein relate to satellite communications, and more particularly to improving the reception of weak signals transmitted from ground-based devices.

Conventional satellite-based communication systems include gateways and one or more satellites to relay communication signals between the gateways and one or more user terminals. A gateway is an earth station having an antenna for transmitting signals to, and receiving signals from, communication satellites. A gateway provides communication links, using satellites, for connecting a user terminal to other user terminals or users of other communication systems, such as a public switched telephone network, the internet and various public and/or private networks. A satellite is an orbiting receiver and repeater used to relay information.

A satellite can receive signals from and transmit signals to a user terminal provided the user terminal is within the "footprint" of the satellite. The footprint of a satellite is the geographic region on the surface of the Earth within the range of signals of the satellite. The footprint is usually geographically divided into "beams," through the use of beam-forming antennas. Each beam covers a particular geographic region within the footprint. Beams may be directed so that more than one beam from the same satellite covers the same specific geographic region.

Geosynchronous satellites have long been used for communications. A geosynchronous satellite is stationary relative to a given location on the Earth, and thus there is little timing shift and frequency shift in radio signal propagation between a communication transceiver on the Earth and the geosynchronous satellite. However, because geosynchronous satellites are limited to a geosynchronous orbit (GSO), the number of satellites that may be placed in the GSO is limited. As alternatives to geosynchronous satellites, communication systems which utilize a constellation of satellites in non-geosynchronous orbits, such as low-earth orbits (LEO), have been devised to provide communication coverage to the entire Earth or at least large parts of the Earth.

Compared to GSO satellite-based and terrestrial communication systems, non-geosynchronous satellite-based systems, such as LEO satellite-based systems, may present several challenges. For example, because LEO satellites move quickly across the sky relative to a given point on the earth's surface, beams transmitted from an LEO satellite may pass relatively quickly across the user terminals. When a beam passes across a user terminal, the user terminal may experience decreased gain in the uplink path (e.g., to the satellite) as the user terminal approaches the edge of the beam (e.g., because the gain at the edges of the beam may be significantly less than the gain at the center of the beam). As a result, the gain of user terminal's uplink path may be reduced as the user terminal moves across and/or between beams, which is not desirable.

It is not feasible for the user terminal to increase its transmission power, for example, because it is typically set at a maximum value. Further, it is not always feasible for the satellite's transponders to separate signals transmitted from different user terminals due to the narrow bandwidths allocated to the user terminals, when compared to the total bandwidth of the transponder. Thus, there is a need to remedy reductions in the uplink path gain associated with user terminals moving across a beam and/or moving between beams when they pass through a common wide band channel in a simple "bent pipe" satellite which has little or no signal processing capability.

SUMMARY

Aspects of the disclosure are directed to an apparatus and methods for addressing reductions in the uplink path gain associated with user terminals moving across a beam and/or moving between beams of an NGSO satellite system. One or more aspects of the disclosure may be implemented in a satellite that includes at least a number of return paths each configured to process communication signals transmitted on a corresponding one of a number of channels. In one example, a method for processing communication signals in a return path of a satellite is disclosed. The method may include receiving, via an antenna coupled to the return path, a number of data signals on a single frequency channel. Each of the number of data signals occupies a unique time-frequency sub-channel of the single frequency channel, originates from a corresponding one of a number of user terminals (UTs), and includes a plurality of time slots dynamically allocated to a group of user equipment (UE) devices associated with the corresponding UT. The method also includes determining a combined power level of all the number of received data signals that occupy all the time-frequency sub-channels of the single frequency channel, and adjusting an amplifier gain applied to the number of received data signals in the return path based, at least in part, on the combined power level.

In another example, a satellite is disclosed that includes a number of return paths, one or more processors, and a memory configured to store instructions. A respective one of the return paths may include an antenna configured to receive a number of data signals on a single frequency channel, wherein each of the number of data signals occupies a unique time-frequency sub-channel of the single frequency channel, originates from a corresponding one of a number of user terminals (UTs), and includes a plurality of time slots dynamically allocated to a group of user equipment (UE) devices associated with the corresponding UT. Execution of the instructions may cause the respective return path to determine a combined power level of all the number of received data signals that occupy all the time-frequency sub-channels of the single frequency channel, and to adjust an amplifier gain applied to the number of received data signals in the return path based, at least in part, on the combined power level.

In another example, a satellite is disclosed that includes a number of return paths. A respective one of the number of return paths may include means for receiving a number of data signals on a single frequency channel, wherein each of the number of data signals occupies a unique time-frequency sub-channel of the single frequency channel, originates from a corresponding one of a number of user terminals (UTs), and includes a plurality of time slots dynamically allocated to a group of user equipment (UE) devices associated with the corresponding UT. The respective one of the number of return paths may also include means for determining a combined power level of the number of received data signals that occupy all the time-frequency sub-channels of the single frequency channel, and may include means for adjusting an amplifier gain applied to the number of received data signals in the respective return path based, at least in part, on the combined power level.

In another example, a non-transitory computer-readable medium is disclosed. The non-transitory computer-readable medium may store instructions that, when executed by one or more processors of a satellite, cause a return path of the satellite to receive a number of data signals on a single frequency channel, wherein each of the number of data signals occupies a unique time-frequency sub-channel of the single frequency channel, originates from a corresponding one of a number of user terminals (UTs), and includes a plurality of time slots dynamically allocated to a group of user equipment (UE) devices associated with the corresponding UT. Execution of the instructions may also cause the return path of the satellite to determine a combined power level of the number of received data signals that occupy all the time-frequency sub-channels of the single frequency channel, and to adjust an amplifier gain applied to the number of received data signals in the return path based, at least in part, on the combined power level.

BRIEF DESCRIPTION OF THE DRAWINGS

Aspects of this disclosure are illustrated by way of example and are not intended to be limited by the figures of the accompanying drawings.

Like reference numerals refer to corresponding parts throughout the drawing figures.

DETAILED DESCRIPTION

Figure 1:
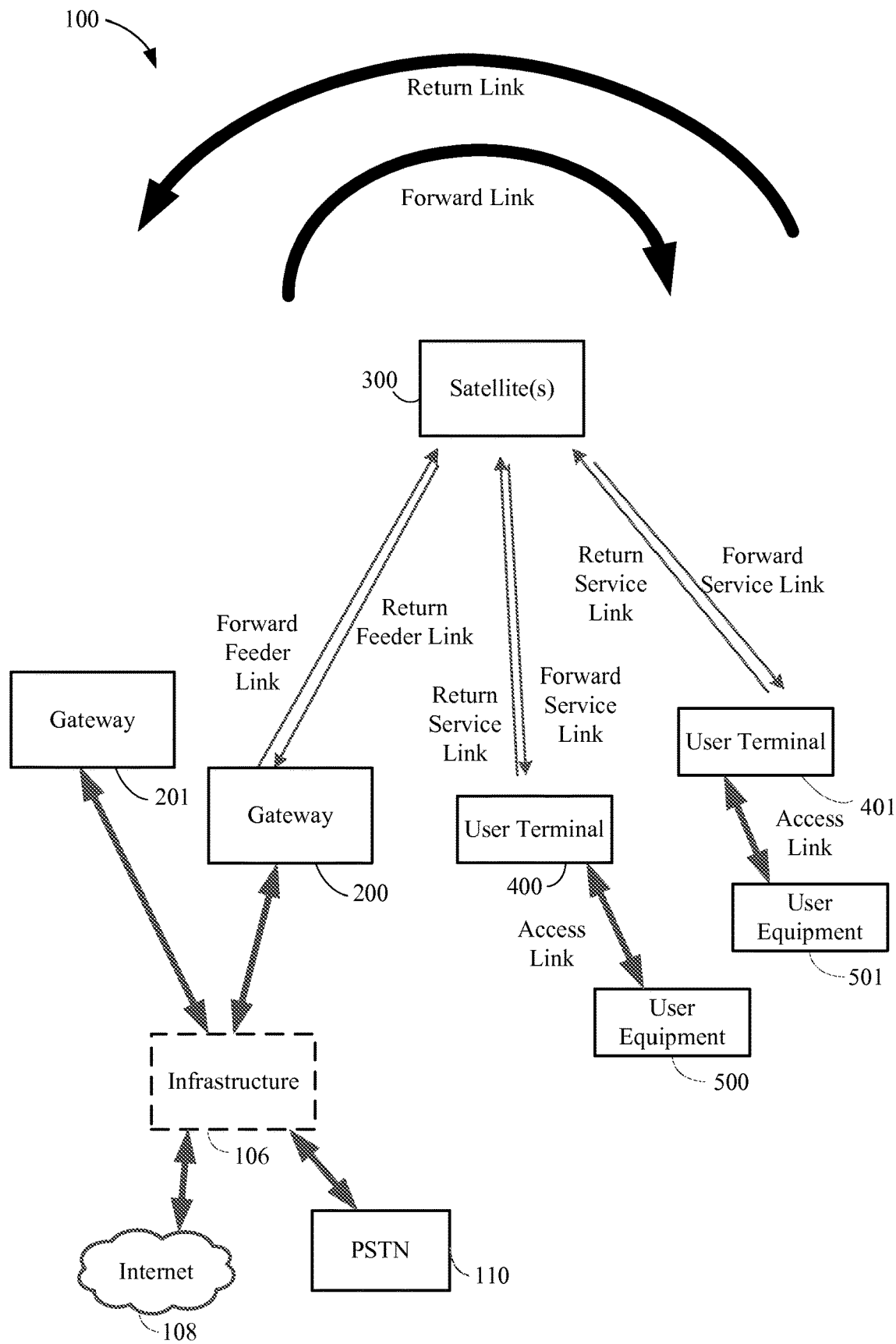
FIG. 1 shows a block diagram of an example communication system.

Aspects of the disclosure are directed to an apparatus and methods for addressing reductions in the uplink path gain associated with user terminals moving across a beam and/or moving between beams of an NGSO satellite system. One or more aspects of the disclosure may be implemented in a satellite that includes at least a number of return paths each configured to process communication signals transmitted on a corresponding one of a number of channels. A respective one of the number of return paths may include at least a variable gain amplifier (VGA) and an automatic gain controller (AGC). The VGA may include an input terminal to receive communication signals transmitted on the corresponding channel, and an output terminal to generate amplified communication signals. The AGC may include an input terminal coupled to the output terminal of the VGA, and an output terminal coupled to the control terminal of the VGA. The AGC may be configured to selectively adjust a gain of the VGA based, at least in part, on a power level of the amplified communication signals. For example, the AGC may increase the gain of the VGA if the power level of the amplified communication signals is less than a threshold level, and may decrease the gain of the VGA if the power level of the amplified communication signals is greater than the threshold level. For some implementations, the threshold level may correspond to a maximum power level associated with the respective return path of the satellite. For other implementations, the threshold level may correspond to an expected power level of the VGA.

Aspects of the disclosure are described in the following description and related drawings directed to specific examples. Alternate examples may be devised without departing from the scope of the disclosure. Additionally, well-known elements will not be described in detail or will be omitted so as not to obscure the relevant details of the disclosure.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

The terminology used herein is for the purpose of describing particular aspects only and is not intended to be limiting of the aspects. It will be further understood that the terms "comprises," "comprising," "includes" or "including," when used herein, specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Further, many aspects are described in terms of sequences of actions to be performed by, for example, elements of a computing device. It will be recognized that various actions described herein can be performed by specific circuits, for example, central processing units (CPUs), graphic processing units (GPUs), digital signal processors (DSPs), application specific integrated circuits (ASICs), field programmable gate arrays (FPGAs), or various other types of general purpose or special purpose processors or circuits, by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the various aspects of the present disclosure. In other instances, well-known circuits and devices are shown in block diagram form to avoid obscuring the present disclosure. The various aspects of the present disclosure are not to be construed as limited to specific examples described herein but rather to include within their scopes all implementations defined by the appended claims.

FIG. 1 illustrates an example of a satellite communication system 100 which includes a plurality of satellites (although only one satellite 300 is shown for clarity of illustration) in non-geosynchronous orbits, for example, low-earth orbits (LEO), a gateway 200 in communication with the satellite 300, a plurality of user terminals (UTs) 400 and 401 in communication with the satellite 300, and a plurality of user equipment (UE) 500 and 501 in communication with the UTs 400 and 401, respectively. Each UE 500 or 501 may be a user device such as a mobile device, a telephone, a smartphone, a tablet, a laptop computer, a computer, a wearable device, a smart watch, an audiovisual device, or any device including the capability to communicate with a UT. Additionally, the UE 500 and/or UE 501 may be a device (e.g., access point, small cell, etc.) that is used to communicate to one or more end user devices. In the example illustrated in FIG. 1, the UT 400 and the UE 500 communicate with each other via a bidirectional access link (having a forward access link and return access link), and similarly, the UT 401 and the UE 501 communicate with each other via another bidirectional access link. In another implementation, one or more additional UE (not shown) may be configured to receive only and therefore communicate with a UT only using a forward access link. In another implementation, one or more additional UE (not shown) may also communicate with UT 400 or UT 401. Alternatively, a UT and a corresponding UE may be integral parts of a single physical device, such as a mobile telephone with an integral satellite transceiver and an antenna for communicating directly with a satellite, for example.

The gateway 200 may have access to the Internet 108 or one or more other types of public, semiprivate or private networks. In the example illustrated in FIG. 1, the gateway 200 is in communication with infrastructure 106, which is capable of accessing the Internet 108 or one or more other types of public, semiprivate or private networks. The gateway 200 may also be coupled to various types of communication backhaul, including, for example, landline networks such as optical fiber networks or public switched telephone networks (PSTN) 110. Further, in alternative implementations the gateway 200 may interface to the Internet 108, PSTN 110, or one or more other types of public, semiprivate or private networks without using infrastructure 106. Still further, gateway 200 may communicate with other gateways, such as gateway 201 through the infrastructure 106 or alternatively may be configured to communicate to gateway 201 without using infrastructure 106. Infrastructure 106 may include, in whole or part, a network control center (NCC), a satellite control center (SCC), a wired and/or wireless core network and/or any other components or systems used to facilitate operation of and/or communication with the satellite communication system 100.

Communications between the satellite 300 and the gateway 200 in both directions are called feeder links, whereas communications between the satellite and each of the UTs 400 and 401 in both directions are called service links. A signal path from the satellite 300 to a ground station, which may be the gateway 200 or one of the UTs 400 and 401, may be generically called a downlink. A signal path from a ground station to the satellite 300 may be generically called an uplink. Additionally, as illustrated, signals can have a general directionality such as a forward link and a return link or reverse link. Accordingly, a communication link in a direction originating from the gateway 200 and terminating at the UT 400 through the satellite 300 is called a forward link, whereas a communication link in a direction originating from the UT 400 and terminating at the gateway 200 through the satellite 300 is called a return link or reverse link. As such, the signal path from the gateway 200 to the satellite 300 is labeled "Forward Feeder Link" whereas the signal path from the satellite 300 to the gateway 200 is labeled "Return Feeder Link" in FIG. 1. In a similar manner, the signal path from each UT 400 or 401 to the satellite 300 is labeled "Return Service Link" whereas the signal path from the satellite 300 to each UT 400 or 401 is labeled "Forward Service Link" in FIG. 1.

Figure 2:
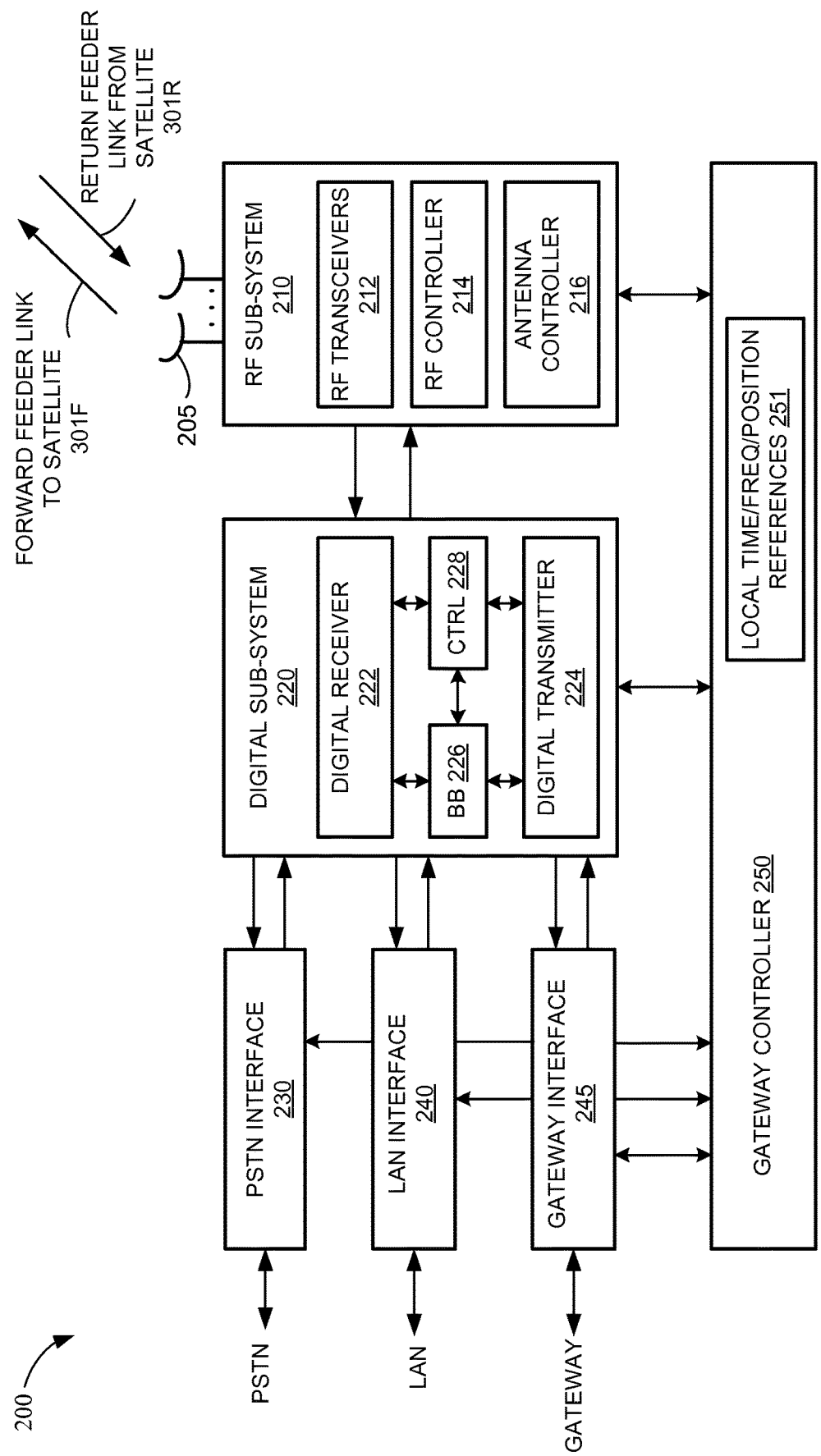
FIG. 2 shows a block diagram of one example of the gateway of FIG. 1.

FIG. 2 is an example block diagram of gateway 200, which also can apply to gateway 201 of FIG. 1. Gateway 200 is shown to include a number of antennas 205, an RF subsystem 210, a digital subsystem 220, a Public Switched Telephone Network (PSTN) interface 230, a Local Area Network (LAN) interface 240, a gateway interface 245, and a gateway controller 250. RF subsystem 210 is coupled to antennas 205 and to digital subsystem 220. Digital subsystem 220 is coupled to PSTN interface 230, to LAN interface 240, and to gateway interface 245. Gateway controller 250 is coupled to RF subsystem 210, digital subsystem 220, PSTN interface 230, LAN interface 240, and gateway interface 245.

RF subsystem 210, which may include a number of RF transceivers 212, an RF controller 214, and an antenna controller 216, may transmit communication signals to satellite 300 via a forward feeder link 301F, and may receive communication signals from satellite 300 via a return feeder link 301R. Although not shown for simplicity, each of the RF transceivers 212 may include a transmit chain and a receive chain. Each receive chain may include a low noise amplifier (LNA) and a down-converter (e.g., a mixer) to amplify and down-convert, respectively, received communication signals in a well-known manner. In addition, each receive chain may include an analog-to-digital converter (ADC) to convert the received communication signals from analog signals to digital signals (e.g., for processing by digital subsystem 220). Each transmit chain may include an up-converter (e.g., a mixer) and a power amplifier (PA) to up-convert and amplify, respectively, communication signals to be transmitted to satellite 300 in a well-known manner. In addition, each transmit chain may include a digital-to-analog converter (DAC) to convert the digital signals received from digital subsystem 220 to analog signals to be transmitted to satellite 300.

The RF controller 214 may be used to control various aspects of the number of RF transceivers 212 (e.g., selection of the carrier frequency, frequency and phase calibration, gain settings, and the like). The antenna controller 216 may control various aspects of the antennas 205 (e.g., beamforming, beam steering, gain settings, frequency tuning, and the like).

The digital subsystem 220 may include a number of digital receiver modules 222, a number of digital transmitter modules 224, a baseband (BB) processor 226, and a control (CTRL) processor 228. Digital subsystem 220 may process communication signals received from RF subsystem 210 and forward the processed communication signals to PSTN interface 230 and/or LAN interface 240, and may process communication signals received from PSTN interface 230 and/or LAN interface 240 and forward the processed communication signals to RF subsystem 210.

Each digital receiver module 222 may correspond to signal processing elements used to manage communications between gateway 200 and UT 400. One of the receive chains of RF transceivers 212 may provide input signals to multiple digital receiver modules 222. A number of digital receiver modules 222 may be used to accommodate all of the satellite beams and possible diversity mode signals being handled at any given time. Although not shown for simplicity, each digital receiver module 222 may include one or more digital data receivers, a searcher receiver, and a diversity combiner and decoder circuit. The searcher receiver may be used to search for appropriate diversity modes of carrier signals, and may be used to search for pilot signals (or other relatively fixed pattern strong signals).

The digital transmitter modules 224 may process signals to be transmitted to UT 400 via satellite 300. Although not shown for simplicity, each digital transmitter module 224 may include a transmit modulator that modulates data for transmission. The transmission power of each transmit modulator may be controlled by a corresponding digital transmit power controller (not shown for simplicity) that may (1) apply a minimum level of power for purposes of interference reduction and resource allocation and (2) apply appropriate levels of power when needed to compensate for attenuation in the transmission path and other path transfer characteristics.

The control processor 228, which is coupled to digital receiver modules 222, digital transmitter modules 224, and baseband processor 226, may provide command and control signals to effect functions such as, but not limited to, signal processing, timing signal generation, power control, handoff control, diversity combining, and system interfacing.

The control processor 228 may also control the generation and power of pilot, synchronization, and paging channel signals and their coupling to the transmit power controller (not shown for simplicity). The pilot channel is a signal that is not modulated by data, and may use a repetitive unchanging pattern or non-varying frame structure type (pattern) or tone type input. For example, the orthogonal function used to form the channel for the pilot signal generally has a constant value, such as all 1's or 0's, or a well-known repetitive pattern, such as a structured pattern of interspersed 1's and 0's.

Baseband processor 226 is well known in the art and is therefore not described in detail herein. For example, the baseband processor 226 may include a variety of known elements such as (but not limited to) coders, data modems, and digital data switching and storage components.

The PSTN interface 230 may provide communication signals to, and receive communication signals from, an external PSTN either directly or through additional infrastructure 106, as illustrated in FIG. 1. The PSTN interface 230 is well known in the art, and therefore is not described in detail herein. For other implementations, the PSTN interface 230 may be omitted, or may be replaced with any other suitable interface that connects gateway 200 to a ground-based network (e.g., the Internet).

The LAN interface 240 may provide communication signals to, and receive communication signals from, an external LAN. For example, LAN interface 240 may be coupled to the internet 108 either directly or through additional infrastructure 106, as illustrated in FIG. 1. The LAN interface 240 is well known in the art, and therefore is not described in detail herein.

The gateway interface 245 may provide communication signals to, and receive communication signals from, one or more other gateways associated with the satellite communication system 100 of FIG. 1 (and/or to/from gateways associated with other satellite communication systems, not shown for simplicity). For some implementations, gateway interface 245 may communicate with other gateways via one or more dedicated communication lines or channels (not shown for simplicity). For other implementations, gateway interface 245 may communicate with other gateways using PSTN 110 and/or other networks such as the Internet 108 (see also FIG. 1). For at least one implementation, gateway interface 245 may communicate with other gateways via infrastructure 106.

Overall gateway control may be provided by gateway controller 250. The gateway controller 250 may plan and control utilization of satellite 300's resources by gateway 200. For example, the gateway controller 250 may analyze trends, generate traffic plans, allocate satellite resources, monitor (or track) satellite positions, and monitor the performance of gateway 200 and/or satellite 300. The gateway controller 250 may also be coupled to a ground-based satellite controller (not shown for simplicity) that maintains and monitors orbits of satellite 300, relays satellite usage information to gateway 200, tracks the positions of satellite 300, and/or adjusts various channel settings of satellite 300.

For the example implementation illustrated in FIG. 2, the gateway controller 250 includes a local time, frequency, and position references 251, which may provide local time and frequency information to the RF subsystem 210, the digital subsystem 220, and/or the interfaces 230, 240, and 245. The time and frequency information may be used to synchronize the various components of gateway 200 with each other and/or with satellite(s) 300. The local time, frequency, and position references 251 may also provide position information (e.g., ephemeris data) of satellite(s) 300 to the various components of gateway 200. Further, although depicted in FIG. 2 as included within gateway controller 250, for other implementations, the local time, frequency, and position references 251 may be a separate subsystem that is coupled to gateway controller 250 (and/or to one or more of digital subsystem 220 and RF subsystem 210).

Although not shown in FIG. 2 for simplicity, the gateway controller 250 may also be coupled to a network control center (NCC) and/or a satellite control center (SCC). For example, the gateway controller 250 may allow the SCC to communicate directly with satellite(s) 300, for example, to retrieve ephemeris data from satellite(s) 300. The gateway controller 250 may also receive processed information (e.g., from the SCC and/or the NCC) that allows gateway controller 250 to properly aim its antennas 205 (e.g., at the appropriate satellite(s) 300), to schedule beam transmissions, to coordinate handovers, and to perform various other well-known functions.

Figure 3:
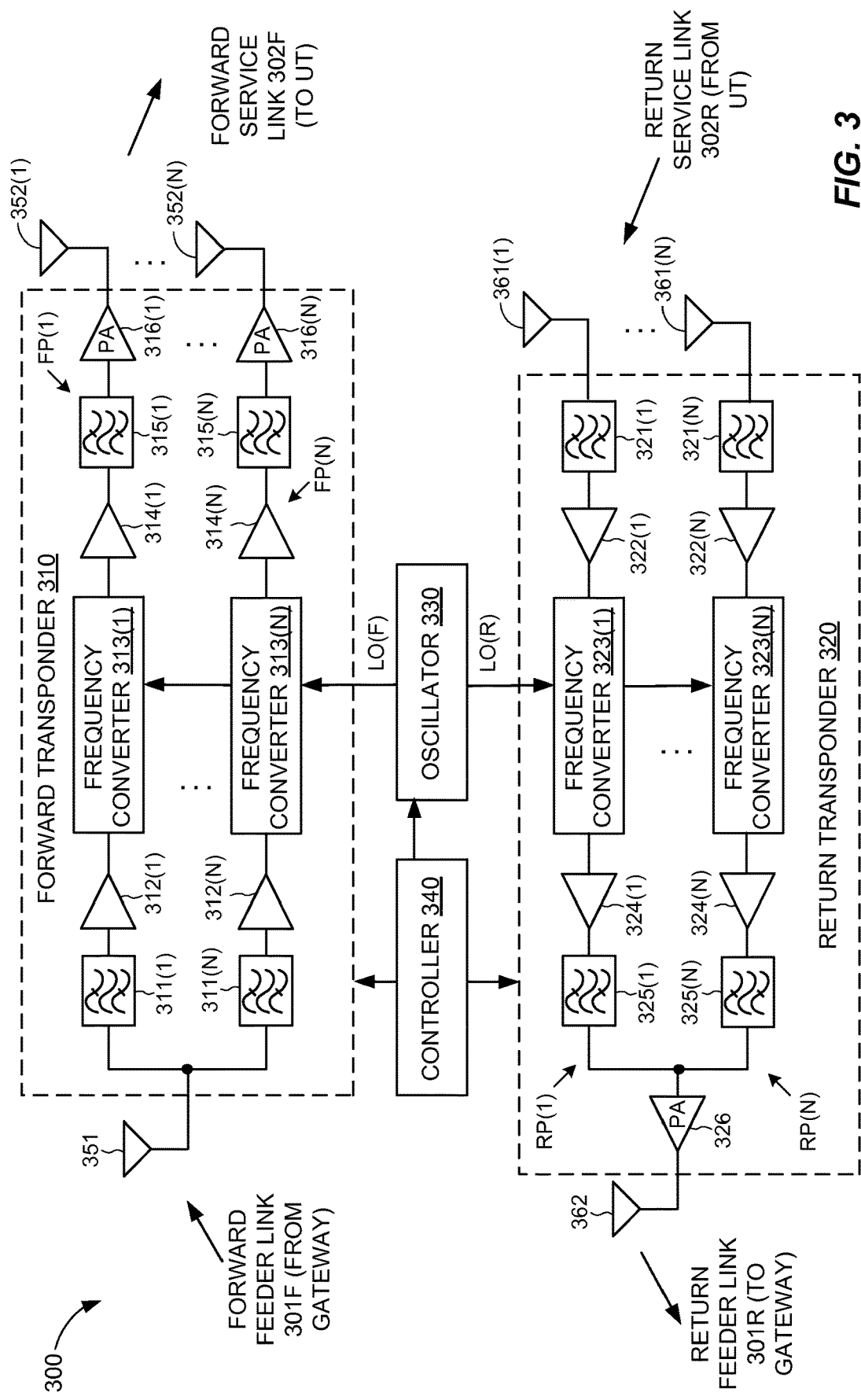
FIG. 3 shows a block diagram of one example of the satellite of FIG. 1.

FIG. 3 is an example block diagram of satellite 300 for illustrative purposes only. It will be appreciated that specific satellite configurations can vary significantly and may or may not include on-board processing. Further, although illustrated as a single satellite, two or more satellites using inter-satellite communication may provide the functional connection between the gateway 200 and UT 400. It will be appreciated that disclosure is not limited to any specific satellite configuration and any satellite or combinations of satellites that can provide the functional connection between the gateway 200 and UT 400 can be considered within the scope of the disclosure. In one example, satellite 300 is shown to include a forward transponder 310, a return transponder 320, an oscillator 330, a controller 340, forward link antennas 351-352, and return link antennas 361-362. The forward transponder 310, which may process communication signals within a corresponding channel or frequency band, may include a respective one of first bandpass filters 311(1)-311(N), a respective one of first LNAs 312(1)-312(N), a respective one of frequency converters 313(1)-313(N), a respective one of second LNAs 314(1)-314(N), a respective one of second bandpass filters 315(1)-315(N), and a respective one of PAs 316(1)-316(N). Each of the PAs 316(1)-316(N) is coupled to a respective one of antennas 352(1)-352(N), as shown in FIG. 3.

Within each of the respective forward paths FP(1)-FP(N), the first bandpass filter 311 passes signal components having frequencies within the channel or frequency band of the respective forward path FP, and filters signal components having frequencies outside the channel or frequency band of the respective forward path FP. Thus, the pass band of the first bandpass filter 311 corresponds to the width of the channel associated with the respective forward path FP. The first LNA 312 amplifies the received communication signals to a level suitable for processing by the frequency converter 313. The frequency converter 313 converts the frequency of the communication signals in the respective forward path FP (e.g., to a frequency suitable for transmission from satellite 300 to UT 400). The second LNA 314 amplifies the frequency-converted communication signals, and the second bandpass filter 315 filters signal components having frequencies outside of the associated channel width. The PA 316 amplifies the filtered signals to a power level suitable for transmission to UTs 400 via respective antenna 352. The return transponder 320, which includes a number N of return paths RP(1)-RP(N), receives communication signals from UT 400 along return service link 302R via antennas 361(1)-361(N), and transmits communication signals to gateway 200 along return feeder link 301R via one or more antennas 362. Each of the return paths RP(1)-RP(N), which may process communication signals within a corresponding channel or frequency band, may be coupled to a respective one of antennas 361(1)-361(N), and may include a respective one of first bandpass filters 321(1)-321(N), a respective one of first LNAs 322(1)-322(N), a respective one of frequency converters 323(1)-323(N), a respective one of second LNAs 324(1)-324(N), and a respective one of second bandpass filters 325(1)-325(N).

Within each of the respective return paths RP(1)-RP(N), the first bandpass filter 321 passes signal components having frequencies within the channel or frequency band of the respective return path RP, and filters signal components having frequencies outside the channel or frequency band of the respective return path RP. Thus, the pass band of the first bandpass filter 321 may for some implementations correspond to the width of the channel associated with the respective return path RP. The first LNA 322 amplifies all the received communication signals to a level suitable for processing by the frequency converter 323. The frequency converter 323 converts the frequency of the communication signals in the respective return path RP (e.g., to a frequency suitable for transmission from satellite 300 to gateway 200). The second LNA 324 amplifies the frequency-converted communication signals, and the second bandpass filter 325 filters signal components having frequencies outside of the associated channel width. Signals from the return paths RP(1)-RP(N) are combined and provided to the one or more antennas 362 via a PA 326. The PA 326 amplifies the combined signals for transmission to the gateway 200.

Oscillator 330, which may be any suitable circuit or device that generates an oscillating signal, provides a forward local oscillator signal LO(F) to the frequency converters 313(1)-313(N) of forward transponder 310, and provides a return local oscillator signal LO(R) to frequency converters 323(1)-323(N) of return transponder 320. For example, the LO(F) signal may be used by frequency converters 313(1)-313(N) to convert communication signals from a frequency band associated with the transmission of signals from gateway 200 to satellite 300 to a frequency band associated with the transmission of signals from satellite 300 to UT 400. The LO(R) signal may be used by frequency converters 323(1)-323(N) to convert communication signals from a frequency band associated with the transmission of signals from UT 400 to satellite 300 to a frequency band associated with the transmission of signals from satellite 300 to gateway 200.

Controller 340, which is coupled to forward transponder 310, return transponder 320, and oscillator 330, may control various communication operations of satellite 300 including (but not limited to) channel allocations and beam steering. In one aspect, the controller 340 may include a memory coupled to a processor (not shown for simplicity). The memory may include a non-transitory computer-readable medium (e.g., one or more nonvolatile memory elements, such as EPROM, EEPROM, Flash memory, a hard drive, etc.) storing instructions that, when executed by the processor, cause the satellite 300 to perform operations including (but not limited to) those described below with respect to FIG. 10.

Figure 4:
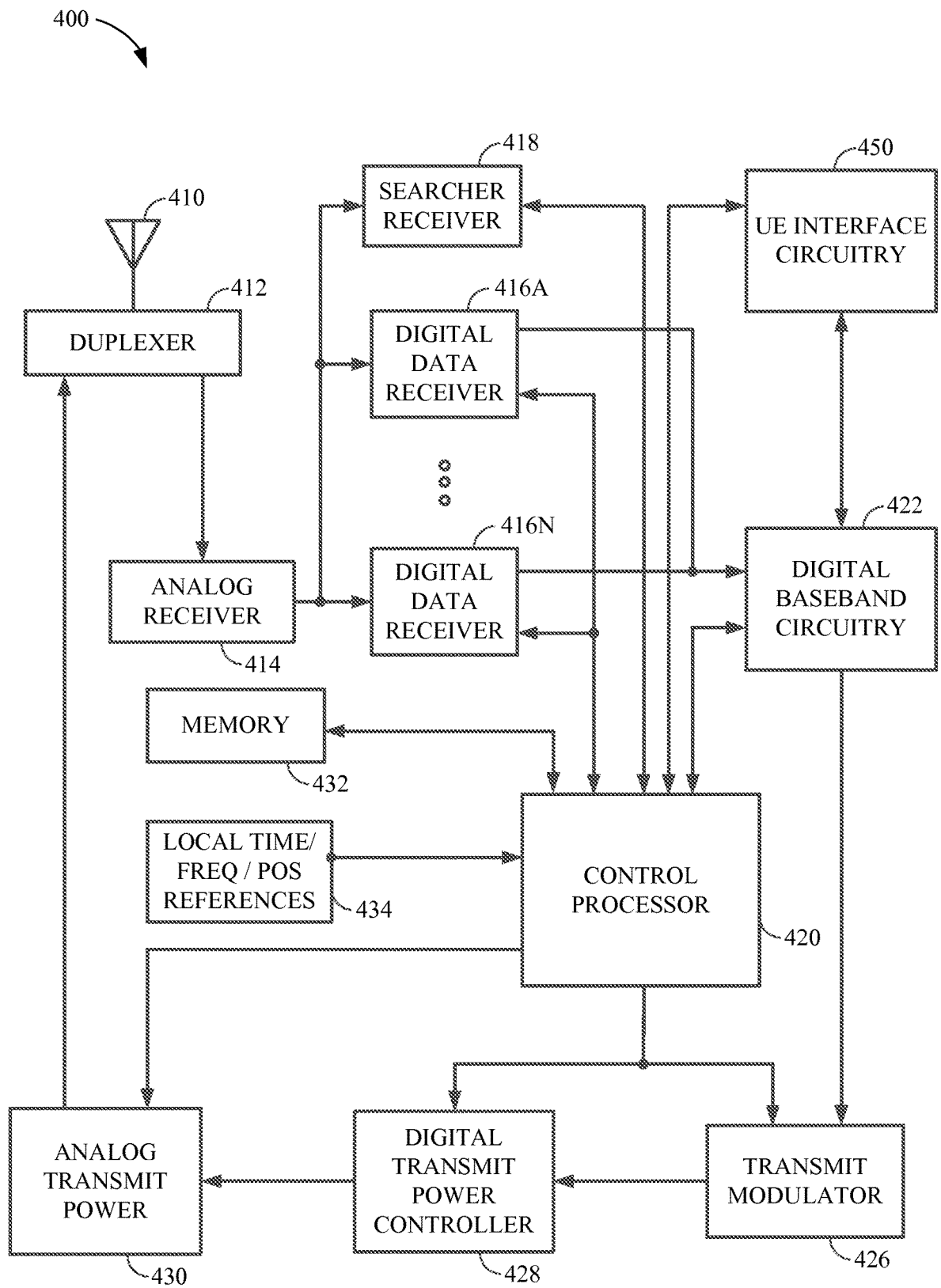
FIG. 4 shows a block diagram of one example of the user terminal (UT) of FIG. 1.

An example of a transceiver for use in the UT 400 or 401 is illustrated in FIG. 4. In FIG. 4, at least one antenna 410 is provided for receiving forward link communication signals (e.g., from satellite 300), which are transferred to an analog receiver 414, where they are down-converted, amplified, and digitized. A duplexer element 412 is often used to allow the same antenna to serve both transmit and receive functions. Alternatively, a UT transceiver may employ separate antennas for operating at different transmit and receive frequencies.

The digital communication signals output by the analog receiver 414 are transferred to at least one digital data receiver 416A and at least one searcher receiver 418. Additional digital data receivers to 416N can be used to obtain desired levels of signal diversity, depending on the acceptable level of transceiver complexity, as would be apparent to one skilled in the relevant art.

At least one user terminal control processor 420 is coupled to digital data receivers 416A-416N and searcher receiver 418. The control processor 420 provides, among other functions, basic signal processing, timing, power and handoff control or coordination, and selection of frequency used for signal carriers. Another basic control function that may be performed by the control processor 420 is the selection or manipulation of functions to be used for processing various signal waveforms. Signal processing by the control processor 420 can include a determination of relative signal strength and computation of various related signal parameters. Such computations of signal parameters, such as timing and frequency may include the use of additional or separate dedicated circuitry to provide increased efficiency or speed in measurements or improved allocation of control processing resources.

The outputs of digital data receivers 416A-416N are coupled to digital baseband circuitry 422 within the user terminal. The digital baseband circuitry 422 comprises processing and presentation elements used to transfer information to and from UE 500 as shown in FIG. 1, for example. Referring to FIG. 4, if diversity signal processing is employed, the digital baseband circuitry 422 may comprise a diversity combiner and decoder. Some of these elements may also operate under the control of, or in communication with, a control processor 420.

When voice or other data is prepared as an output message or communications signal originating with the user terminal, the digital baseband circuitry 422 is used to receive, store, process, and otherwise prepare the desired data for transmission. The digital baseband circuitry 422 provides this data to a transmit modulator 426 operating under the control of the control processor 420. The output of the transmit modulator 426 is transferred to a power controller 428 which provides output power control to a transmit power amplifier 430 for final transmission of the output signal from the antenna 410 to a satellite (e.g., satellite 300).

In FIG. 4, the UT transceiver also includes a memory 432 associated with the control processor 420. The memory 432 may include instructions for execution by the control processor 420 as well as data for processing by the control processor 420.

In the example illustrated in FIG. 4, the UT 400 also includes an optional local time, frequency and/or position references 434 (e.g., a GPS receiver), which may provide local time, frequency and/or position information to the control processor 420 for various applications, including, for example, time and frequency synchronization for the UT 400.

Digital data receivers 416A-N and searcher receiver 418 are configured with signal correlation elements to demodulate and track specific signals. Searcher receiver 418 is used to search for pilot signals, or other relatively fixed pattern strong signals, while digital data receivers 416A-N are used to demodulate other signals associated with detected pilot signals. However, a digital data receiver 416 can be assigned to track the pilot signal after acquisition to accurately determine the ratio of signal chip energies to signal noise, and to formulate pilot signal strength. Therefore, the outputs of these units can be monitored to determine the energy in, or frequency of, the pilot signal or other signals. These receivers also employ frequency tracking elements that can be monitored to provide current frequency and timing information to control processor 420 for signals being demodulated.

The control processor 420 may use such information to determine to what extent the received signals are offset from the oscillator frequency, when scaled to the same frequency band, as appropriate. This and other information related to frequency errors and frequency shifts can be stored in a storage or memory element 432 as desired.

The control processor 420 may also be coupled to UE interface circuitry 450 to allow communications between UT 400 and one or more UEs. UE interface circuitry 450 may be configured as desired for communication with various UE configurations and accordingly may include various transceivers and related components depending on the various communication technologies employed to communicate with the various UEs supported. For example, UE interface circuitry 450 may include one or more antennas, a wide area network (WAN) transceiver, a wireless local area network (WLAN) transceiver, a Local Area Network (LAN) interface, a Public Switched Telephone Network (PSTN) interface and/or other known communication technologies configured to communicate with one or more UEs in communication with UT 400.

Figure 5:
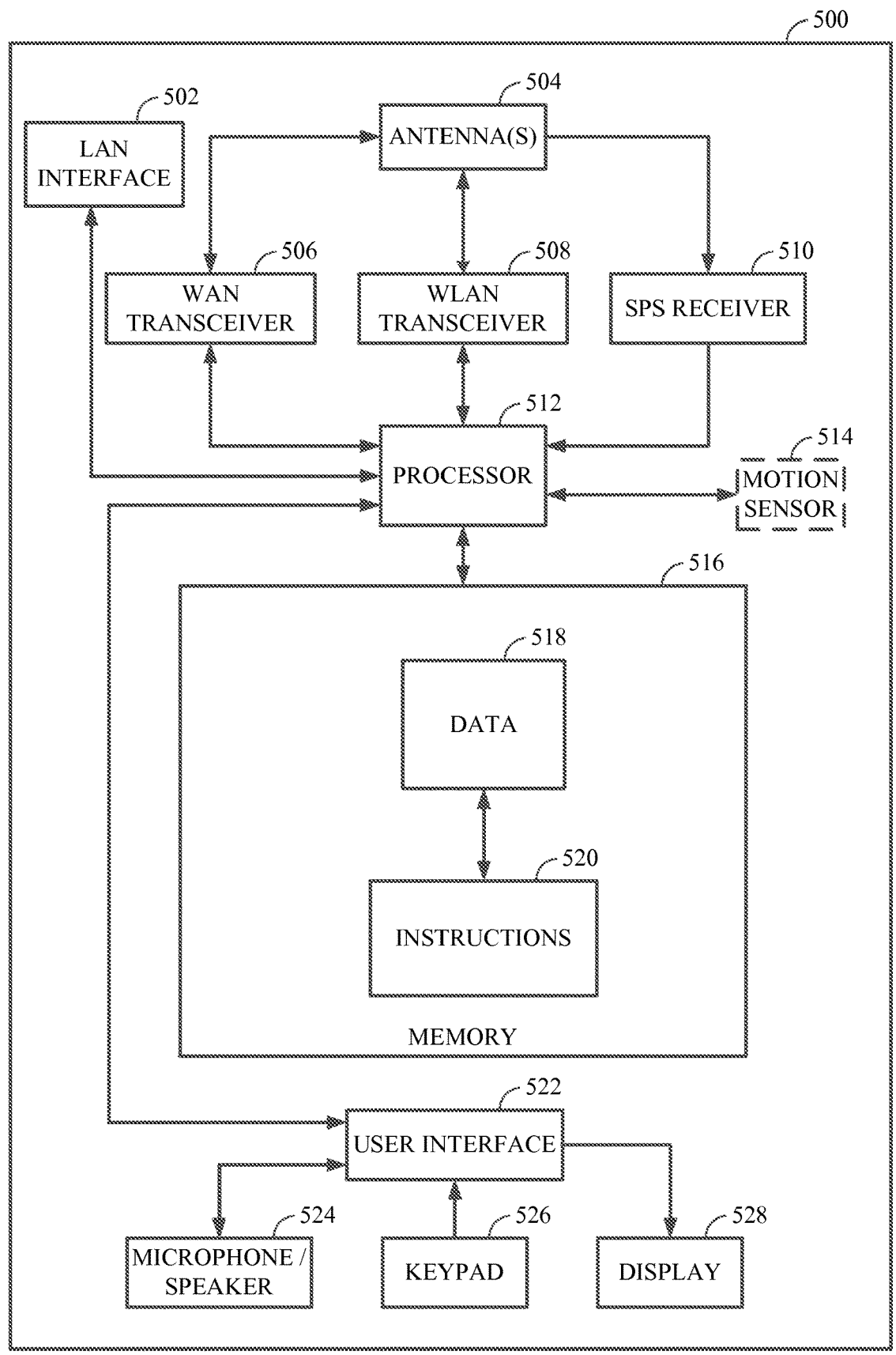
FIG. 5 shows a block diagram of one example of the user equipment (UE) device of FIG. 1.

FIG. 5 is a block diagram illustrating an example of UE 500, which also can apply to UE 501 of FIG. 1. The UE 500 as shown in FIG. 5 may be a mobile device, a handheld computer, a tablet, a wearable device, a smart watch, or any type of device capable of interacting with a user, for example. Additionally, the UE 500 may be a network side device that provides connectivity to various ultimate end user devices and/or to various public or private networks. In the example shown in FIG. 5, the UE 500 may comprise a LAN interface 502, one or more antennas 504, a wide area network (WAN) transceiver 506, a wireless local area network (WLAN) transceiver 508, and a satellite positioning system (SPS) receiver 510. The SPS receiver 510 may be compatible with the Global Positioning System (GPS), the Global Navigation Satellite System (GLONASS) and/or any other global or regional satellite based positioning system. In an alternate aspect, the UE 500 may include a WLAN transceiver 508, such as a Wi-Fi transceiver, with or without the LAN interface 502, WAN transceiver 506, and/or SPS receiver 510, for example. Further, UE 500 may include additional transceivers such as Bluetooth, ZigBee and other known technologies, with or without the LAN interface 502, WAN transceiver 506, WLAN transceiver 508 and/or SPS receiver 510. Accordingly, the elements illustrated for UE 500 are provided merely as an example configuration and are not intended to limit the configuration of UEs in accordance with the various aspects disclosed herein.

In the example shown in FIG. 5, a processor 512 is connected to the LAN interface 502, the WAN transceiver 506, the WLAN transceiver 508 and the SPS receiver 510. Optionally, a motion sensor 514 and other sensors may also be coupled to the processor 512.

A memory 516 is connected to the processor 512. In one aspect, the memory 516 may include data 518 which may be transmitted to and/or received from the UT 400, as shown in FIG. 1. Referring to FIG. 5, the memory 516 may also include stored instructions 520 to be executed by the processor 512 to perform the process steps for communicating with the UT 400, for example. Furthermore, the UE 500 may also include a user interface 522, which may include hardware and software for interfacing inputs or outputs of the processor 512 with the user through light, sound or tactile inputs or outputs, for example. In the example shown in FIG. 5, the UE 500 includes a microphone/speaker 524, a keypad 526, and a display 528 connected to the user interface 522. Alternatively, the user's tactile input or output may be integrated with the display 528 by using a touch-screen display, for example. Once again, the elements illustrated in FIG. 5 are not intended to limit the configuration of the UEs disclosed herein and it will be appreciated that the elements included in the UE 500 will vary based on the end use of the device and the design choices of the system engineers.

Additionally, the UE 500 may be a user device such as a mobile device or external network side device in communication with but separate from the UT 400 as illustrated in FIG. 1, for example. Alternatively, the UE 500 and the UT 400 may be integral parts of a single physical device.

For an example implementation discussed below, the return service link 302R may have a total bandwidth of approximately 1000 MHz, and may support N=8 frequency channels, each having a bandwidth of approximately 125 MHz (e.g., each of the 8 frequency channels may be approximately 125 MHZ wide). Further, for the example implementations discussed herein, each frequency channel may support a number S=5, as an example, of time-frequency sub-channels each approximately 20 MHz wide. For purposes of discussion herein, each of the 5 time-frequency sub-channels within a given one of the 8 frequency channels may be associated with (e.g., assigned to) communication signals received from (and transmitted to) a corresponding UT 400. For other implementations, the return service link 302R may be of any suitable bandwidth (e.g., greater than or less than 1000 MHz), and may support any suitable number of frequency channels (e.g., greater than or less than the N=8 frequency channels described herein with respect to example implementations). In addition, each of the frequency channels may have any suitable bandwidth, and may support any suitable number of time-frequency sub-channels (e.g., greater than or less than the S=5 time-frequency sub-channels described herein with respect to example implementations).

Figure 6:
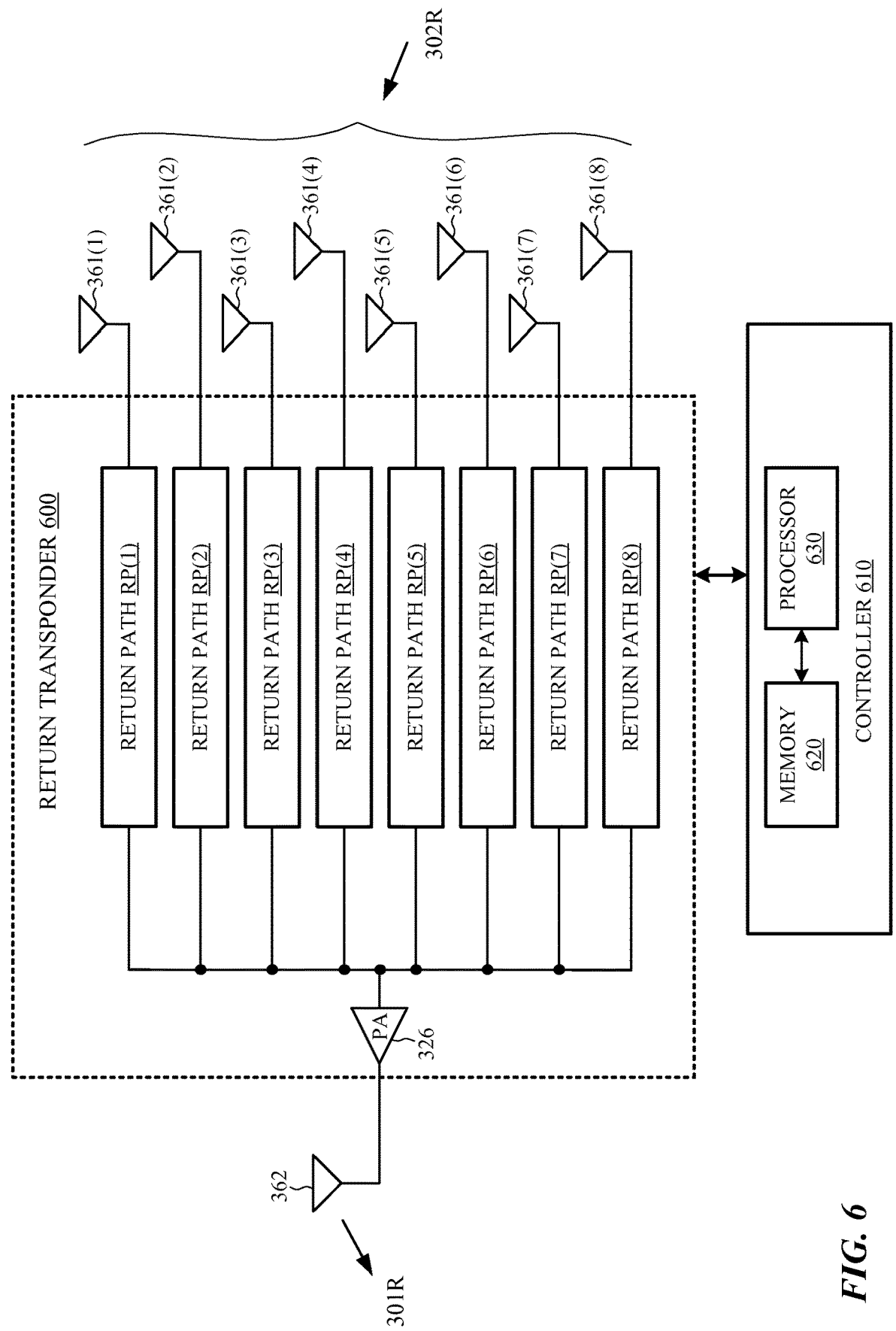
FIG. 6 shows a block diagram of an example return transponder of a satellite in accordance with some implementations.

FIG. 6 is a block diagram of an example return transponder 600 that may be used for the return transponder 320 of satellite 300 (see also FIG. 3). The example return transponder 600 may be configured to process communication signals received on a number N=8 of different frequency channels, and each of the different frequency channels may be divided into a number S=5 of time-frequency sub-channels. As shown in the example of FIG. 6, the return transponder 600 includes a number N=8 return paths RP(1)-RP(8). Each of the return paths RP(1)-RP(8) of return transponder 600 may process communication signals associated with (or assigned to) a corresponding one of the 8 frequency channels. Thus, for example, return path RP(1) may be assigned to the lowest 125 MHz-wide frequency channel, return path RP(2) may be assigned to the next lowest 125 MHz-wide frequency channel, and so on, and return path RP(8) may be assigned to the highest 125 MHz-wide frequency channel. Each of return paths RP(1)-RP(8) may concurrently process a number of different signals that each occupy a unique time-frequency sub-channel of a corresponding one of the channels. Thus, for the example implementation shown in FIG. 6, the return transponder 600 may process signals within a total of 8*5=40 different sub-channels. For other implementations, return transponder 600 may include any suitable number of return paths RP, and each return path may be configured to concurrently process signals occupying any suitable number of time-frequency sub-channels within a corresponding one of the frequency channels.

In one aspect, the return transponder 600 may be coupled to a controller 610 that includes a memory 620 coupled to a processor 630. The memory 620 may include a non-transitory computer-readable medium (e.g., one or more nonvolatile memory elements, such as EPROM, EEPROM, Flash memory, a hard drive, etc.) storing instructions that, when executed by the processor 630, cause the return transponder 600 to perform operations including (but not limited to) those described below with respect to FIG. 10. Processor 630 may be any suitable one or more processors capable of executing scripts or instructions of one or more software programs stored in satellite 300 (e.g., within memory 620). Further, although not specifically shown in FIG. 6, for example implementations, the processor 630 may be connected either directly or indirectly to each of the return paths RP(1)-RP(8) any signal lines and/or buses. In other aspects, each of the return paths RP(1)-RP(8) may include one or more processors such as processor 630.

Although not shown for simplicity, for example implementations discussed herein, one example of the forward transponder 310 of satellite 300 may include N=8 forward paths FP(1)-FP(8), with each of the 8 forward paths FP(1)-FP(8) processing signals for 5 sub-channels within a corresponding one of the 8 frequency channels. For other implementations, the forward transponder 310 may include any suitable number of forward paths FP, and each forward path may be configured to process signals within any suitable number of sub-channels (which in turn may be of any suitable width).

As mentioned above, example implementations described herein may use eight different frequency channels, with each of the different frequency channels including five unique time-frequency sub-channels (although for other implementations, one or more examples of satellite 300 may use more (or less) than eight frequency channels, and each of the frequency channels may include more (or less) than five time-frequency sub-channels). Each of the time-frequency sub-channels may be used by (or otherwise assigned to) a corresponding one of a plurality of UTs 400. Because different UTs 400 may have different spatial characteristics relative to the service link receive antennas 361(1)-361(8) (e.g., the UTs 400 may be located in different positions), the signal strengths of communication signals transmitted from the UTs 400 (and therefore the relative signal strengths of their corresponding sub-channels) may be different. In addition, because a group of UE devices 500 associated with a respective one of the UTs 400 may have different spatial characteristics relative to the respective UT 400 (e.g., the UE devices 500 in a given group of UE devices 500 may be located in different positions), the signal strengths of communication signals transmitted from each of the UE devices 500 associated with the respective UT 400 may be different.

More specifically, because a plurality of UE devices 500 associated with a respective UT 400 may share the same time-frequency sub-channel allocated to the respective UT 400, differences in the locations of the UE devices 500, differences in the transmit power levels of the UE devices 500, and/or differences in the channel conditions associated with of the UE devices 500 may cause the signal strength of the time-frequency sub-channel assigned to the respective UT 400 to rapidly fluctuate, for example, when adjacent time slots of the corresponding time-frequency sub-channel are assigned to different UE devices 500. When one or more of the signal strengths of data signals transmitted from the UTs 400 falls below a critical level, the signal-to-noise ratio (SNR) of such data signals may be insufficient for proper reception by satellite 300 and/or insufficient to allow gateway 200 to recover data from the data signals subsequently re-transmitted by satellite 300.

Figure 7:
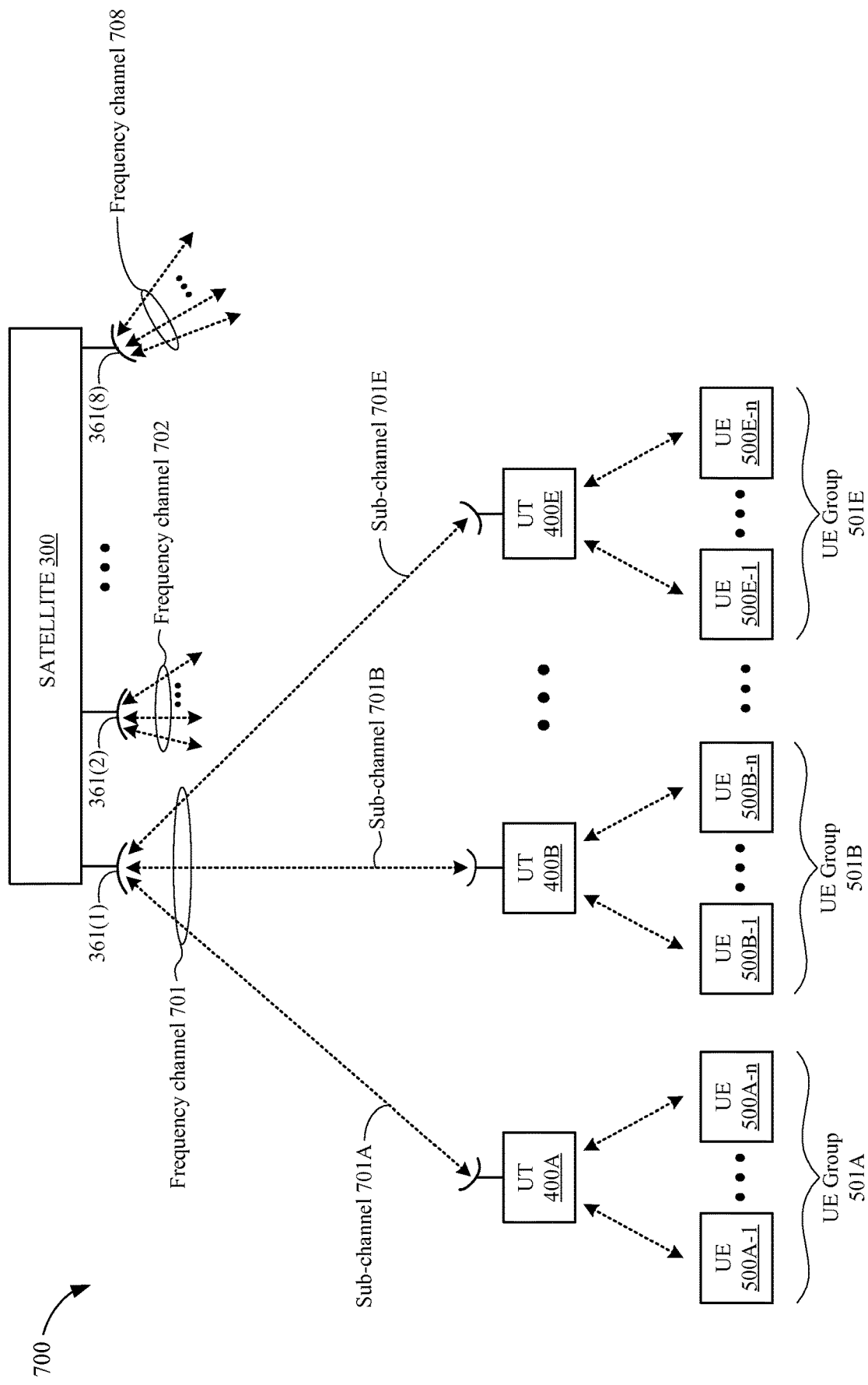
FIG. 7 shows a diagram depicting a number of UTs each facilitating communications between a corresponding group of UE devices and a satellite, in accordance with some implementations.

For example, FIG. 7 shows a diagram 700 depicting a plurality of UTs 400A-400E communicating with satellite 300 on a single frequency channel 701. For the example of FIG. 7, the plurality of UTs 400A-400E may exchange data signals with satellite 300, on the single frequency channel 701, via a first antenna 361(1) of the satellite 300. The other antennas 361(2)-361(8) of satellite 300 may transmit data signals to and/or receive data signals from other groups of UTs 400 (not shown for simplicity) via other frequency channels 702-708, respectively. Each of the other frequency channels 702-708 may also include a plurality of time-frequency sub-channels that, as described in more detail below, may each be assigned or allocated to a corresponding different group or plurality of UTs 400.

Each of the UTs 400A-400E may be assigned to a respective one of the time-frequency sub-channels 701A-701E of frequency channel 701, and may be associated with a respective one of the UE groups 501A-501E. For example, a first UT 400A may communicate with satellite 300 on a first time-frequency sub-channel 701A of the first frequency channel 701, and may be associated with a first UE group 501A that includes UE devices 500A-1 to 500A-n. Thus, each of the UE devices 500A-1 to 500A-n in the first UE group 501A may communicate with satellite 300, via UT 400A, using allocated portions of the first time-frequency sub-channel 701A. More specifically, the UE devices 500A-1 to 500A-n may time-share the first time-frequency sub-channel 701A to communicate with satellite 300 via the first UT 400A. For some example implementations, the first time-frequency sub-channel 701A may be divided into a plurality of time slots, and the first UT 400A may dynamically assign or allocate the plurality of time slots to the UE devices 500A-1 to 500A-n in the first UE group 501A. The plurality of time slots of the first time-frequency sub-channel 701A may be dynamically assigned or allocated to the UE devices 500A-1 to 500A-n in the first UE group 501A in any suitable manner.

For one example, the plurality of time slots of the first time-frequency sub-channel 701A may be assigned or allocated to the UE devices 500A-1 to 500A-n using a round-robin technique. For another example, the plurality of time slots of the first time-frequency sub-channel 701A may be assigned or allocated to the UE devices 500A-1 to 500A-n using a weighted fair queuing (WFQ) technique. For yet another example, the plurality of time slots of the first time-frequency sub-channel 701A may be assigned or allocated to the UE devices 500A-1 to 500A-n according to traffic classification or traffic priority (e.g., using access categories or traffic identifiers (TIDs) for voice data, video data, best effort data, and background data). For still another example, the plurality of time slots of the first time-frequency sub-channel 701A may be assigned or allocated to the UE devices 500A-1 to 500A-n based on medium access contention operations of the UE devices 500A-1 to 500A-n. The above examples are illustrative rather than exhaustive, and thus other factors, variables, and/or considerations may be used to assign or allocate the plurality of time slots to the UE devices 500A-1 to 500A-n.

The other UTs 400B to 400E may communicate with satellite 300 on respective time-frequency sub-channels 701B to 701E, and may be associated with respective groups 501B to 501E of UE devices. For example, the second UT 400B may communicate with satellite 300 on a second time-frequency sub-channel 701B of the first frequency channel 701, and may be associated with a second UE group 501B that includes UE devices 500B-1 to 500B-n, and so, where the fifth UT 400E may communicate with satellite 300 on a fifth time-frequency sub-channel 701E of the first frequency channel 701, and may be associated with a fifth UE group 501E that includes UE devices 500E-1 to 500E-n. Further, each of the other UTs 400B to 400E may also dynamically assign or allocate a plurality of time slots of respective time-frequency sub-channels 701B to 701E to the UE devices 500 within respective UE groups 501B to 501E.

As mentioned above, the UE devices 500 within a respective one of UE groups 501A-501E may alternately transmit data to the satellite 300 on a respective one of time-frequency sub-channels 701A-701E of the frequency channel 701 by sharing time slots. Thus, for at least some implementations, data may be transmitted on frequency channel 701 (as well as the other frequency channels 702-708) using time-division multiple-access (TDMA) techniques. The application of TDMA techniques to the time-frequency sub-channels 701A-701E within frequency channel 701 may allow each of the UTs 400A-400E to service a multitude of UE devices 500 within respective UE groups 501A-501E using a corresponding one of the time-frequency sub-channels 701A-701E of frequency channel 701. Thus, although not shown in FIG. 7 for simplicity, the application of TDMA techniques to the time-frequency sub-channels within the other frequency channels 702-708 may allow each of a plurality of other UTs 400 to service a multitude of UE devices 500 using a single time-frequency sub-channel of a corresponding one of the other frequency channels 702-708.

Because successive time slots of each of the time-frequency sub-channels 701A-701E may be assigned to different UE devices 500 within a corresponding one of UE groups 501A-501E, data signals transmitted on the time-frequency sub-channels 701A-701E may not be accompanied by a pilot signal or pilot tone. More specifically, as described in more detail below, the allocation of adjacent time slots of a given one of the time-frequency sub-channels 701A-701E to different UE devices 500 may preclude the use of pilot signals, for example, because it may not be feasible for each of the UE devices 500 to generate a pilot signal and/or for the UTs 400A-400E to normalize different pilot signals received from various UE devices 500 within respective UE groups 501A-501E. More specifically, the relatively short duration of the time slots (e.g., which may be on the order of a millisecond) of the time-frequency sub-channels within each of the frequency channels 701-708 may preclude the UE devices 500 from generating and/or including pilot signals or pilot tones with data signal transmissions to the satellite 300 via the UTs 400A-400E. Accordingly, the example implementations may not have the benefit of using transmitted pilot signals or pilot tones to control or adjust amplifier gain settings within the satellite 300.

As mentioned above, the signal strengths of the UTs 400A-400E may also differ, for example, because the UTs 400A-400E may have different locations, may have different transmit power levels, and/or may experience different channel conditions. The signal strengths of the UE devices 500 within a respective one of UE groups 501A-501E may also differ, for example, because the UE devices 500 may also have different locations, different transmit power levels, and/or different channel conditions. Thus, the allocation of adjacent time slots to different UE devices 500 may cause rapid changes in the signal strengths of the time-frequency sub-channels, which in turn may result in rapid changes in the signal strengths of the different frequency channels 701-708.

Figure 8A:
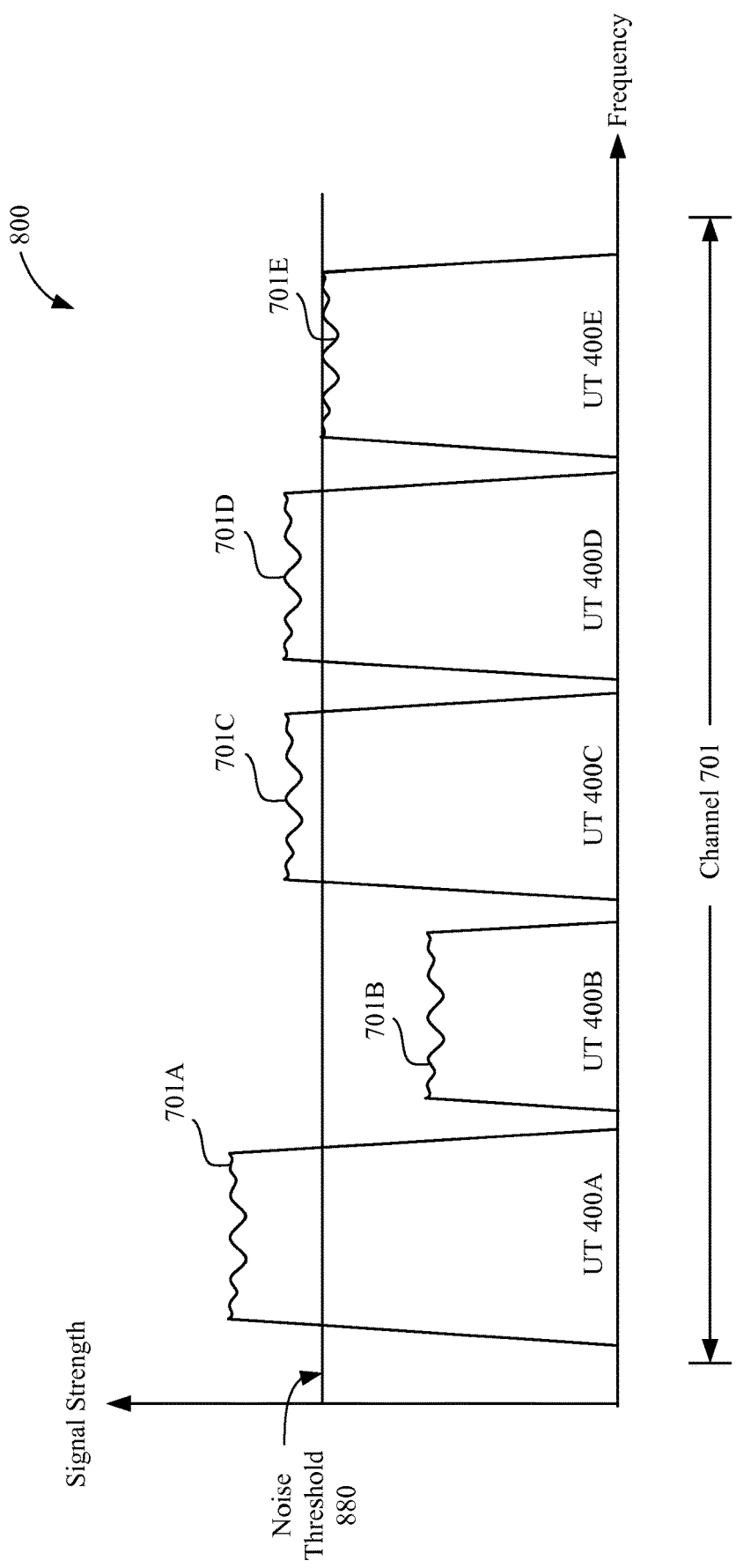
FIG. 8A shows a diagram depicting example signal strengths for the time-frequency sub-channels 701A-701E within the frequency channel 701 of FIG. 7.

FIG. 8A is a diagram 800 depicting the relative signal strengths for the time-frequency sub-channels 701A-701E of the frequency channel 701 of FIG. 7. As described above with respect to FIG. 7, the time-frequency sub-channels 701A-701E of frequency channel 701 may be used to concurrently transmit data signals from the UTs 400A-400E, respectively. For example, the first sub-channel 701A may be assigned to the first UT 400A, the second sub-channel 701B may be assigned to the second UT 400B, the third sub-channel 701C may be assigned to the third UT 400C, the fourth sub-channel 701D may be assigned to the fourth UT 400D, and the fifth sub-channel 701E may be assigned to the fifth UT 400E.

As depicted in FIG. 8A, data signals transmitted from UTs 400A and 400C-400E on respective time-frequency sub-channels 701A and 701C-701E have signal strengths greater than a noise threshold 880, and data signals transmitted from UT 400B on sub-channel 701B have a signal strength below the noise threshold 880. More specifically, while the signal strengths of sub-channels 701A and 701C-701E are greater than the noise threshold 880, the signal strength of sub-channel 701B is less than the noise threshold 880. As a result, satellite 300 may not be able to properly receive data signals transmitted from the second UT 400B on the second sub-channel 701B, which in turn may prevent gateway 200 from being able to recover data transmitted from one or more UE devices 500B-1 to 500B-n associated with the second UT 400B. For an example implementation, a range of signal strengths associated with sub-channels 701A-701E may be limited to less than 10 dB. For other implementations, the range of signal strengths associated with sub-channels 701A-701E may be limited to a selected or predetermined amount that may be more or less than 10 dB. Thus, there is a need to amplify, within each of the return paths RP(1)-RP(8) of the satellite 300, data signals received on a corresponding one of the frequency channels 701-708, for example, when the signal strength of one or more of the time-frequency sub-channels within the corresponding one of frequency channels 701-708 falls below the noise threshold 880.

Figure 8B:
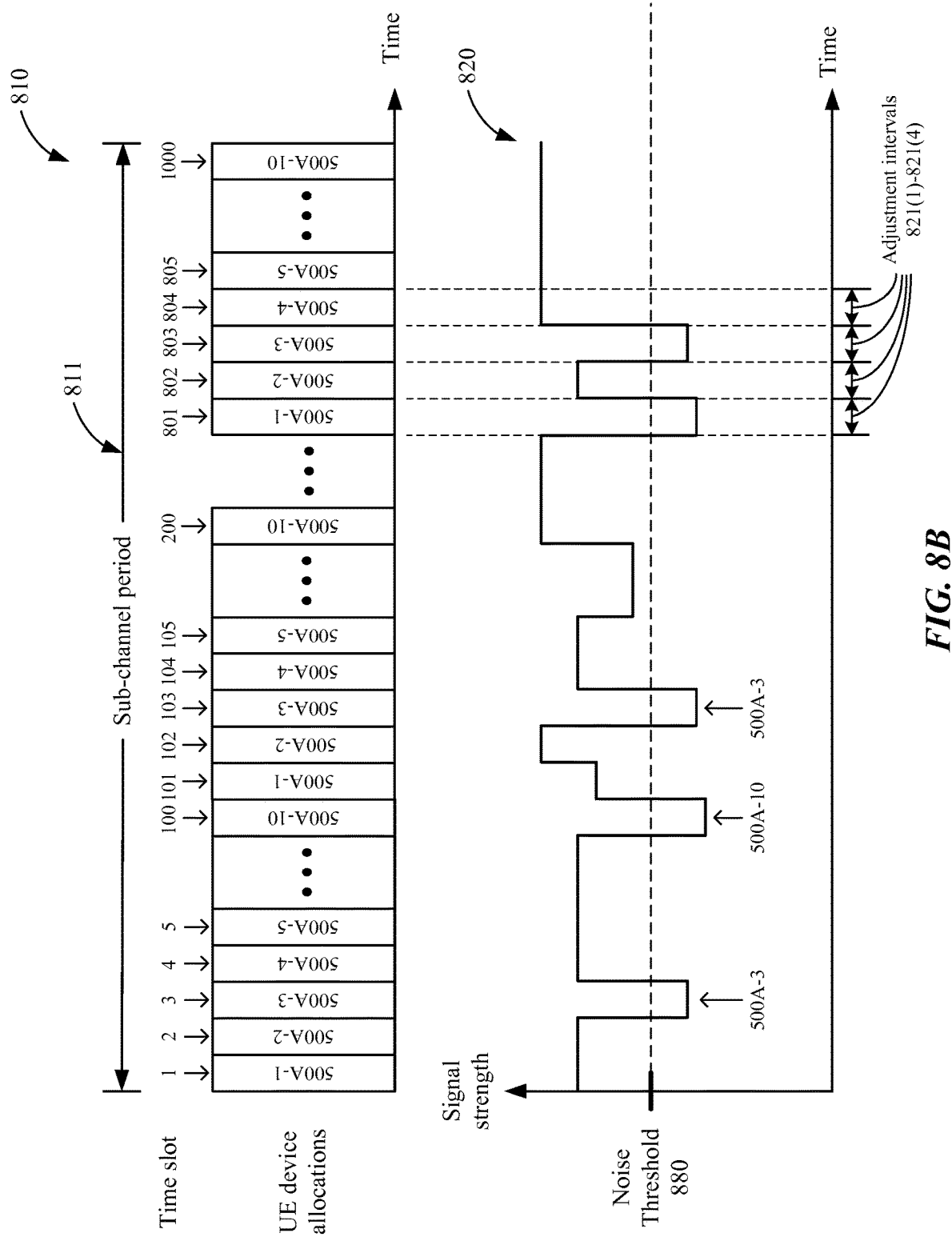
FIG. 8B shows a diagram depicting example allocations of time slots of a respective one of the time-frequency sub-channels to a corresponding group of UE devices and depicting example signal strength variations between the time slots.

FIG. 8B shows a diagram 810 depicting example allocations of a plurality of time slots of the time-frequency sub-channel 701A to the UE devices 500A-1 to 500A-n of the UE group 501A associated with the first UT 400A, and also shows a diagram 820 depicting example signal strength variations between adjacent time slots of the time-frequency sub-channel 701A. As shown in FIG. 8B, each period 811 of the time-frequency sub-channel 701A may be divided into a number N=1000 time slots. For one example implementation, the sub-channel period 811 may have a duration of 1 second, and each time slot of the time-frequency sub-channel 701A may have a duration of approximately 1 millisecond (ms). For other implementations, the sub-channel period 811 may be of any suitable duration, and each period 811 of the time-frequency sub-channel 701A may be divided into any suitable number of time slots. Thus, the depiction of the time-frequency sub-channel 701A divided into 1000 time slots, each lasting approximately 1 ms, is merely illustrative of one example implementation.

As depicted in diagram 810, the 1000 time slots within sub-channel period 811 may be dynamically assigned to various UE devices 500 associated with the first UE group 500A. For the example of FIG. 8B, a number M=10 of UE devices 500A-1 to 500A-10 are sequentially allocated time slots of the first time-frequency sub-channel 701A (e.g., in a round-robin manner). Thus, the first 100 time slots may be allocated to UE devices 500A-1 to 500A-10 as follows: time slot 1 is assigned to UE device 500A-1, time slot 2 is assigned to UE device 500A-2, time slot 3 is assigned to UE device 500A-3, time slot 4 is assigned to UE device 500A-4, time slot 5 is assigned to UE device 500A-5, and so on, where time slot 100 is assigned to UE device 500A-10. Each of the next 9 groups of 100 time slots may be allocated to UE devices 500A-1 to 500A-10 in a similar manner. As mentioned above, the time slots of the time-frequency sub-channels within each of the frequency channels 701-708 may be allocated to UE devices 500 in corresponding UE groups 501 in any suitable manner, and thus the example allocation of time slots in FIG. 8B is merely illustrative of one example implementation.

For the example of FIG. 8B, the signal strength of time-frequency sub-channel 701A immediately prior to time slot 801 is above noise threshold 880. At the beginning of time slot 801 (which is allocated to UE device 500A-1), the signal strength almost instantaneously decreases to a level below noise threshold 880, almost instantaneously increases to a level above noise threshold 880 during time slot 802 (which is allocated to UE device 500A-2), and almost instantaneously decreases to a level below noise threshold 880 during time slot 803 (which is allocated to UE device 500A-3), and then almost instantaneously increases to a level above noise threshold 880 during time slot 804 (which is allocated to UE device 500A-4). Because the signal strength of time-frequency sub-channel 701A is below noise threshold 880 during time slots 801 and 803 (e.g., due to weak data signals transmitted from UE devices 500A-1 and 500A-3), the satellite 300 may not be able to re-transmit data received from UE devices 500A-1 and 500A-3, via UT 400A during respective time slots 801 and 803, to gateway 200 without a level of noise that is above an acceptable threshold level (see also FIG. 1).

Accordingly, example implementations of satellite 300 may be configured to increase the amplifier gain applied to data signals received on frequency channel 701 during time slots 801 and 803, for example, to compensate for the signal strength of time-frequency sub-channel 701A falling below the noise threshold 880 during time slots 801 and 803. Further, because the signal strength of time-frequency sub-channel 701A is above the noise threshold 880 during time slots 802 and 804, example implementations of satellite 300 may be configured to decrease (or at least not increase) the amplifier gain applied to data signals received on frequency channel 701 during time slots 802 and 804, for example, so that a maximum power level associated with one or more amplifiers provided within a corresponding return path of satellite 300 are not exceeded. Thus, the satellite 300 may be configured to selectively adjust one or more amplifier gains at the beginning of each of adjustment intervals 821(1)-821(4). For some implementations, the adjustment intervals 821(1)-821(4) may each have a time period equal to the duration of the time-frequency sub-channels' time slots.

Figure 9A:
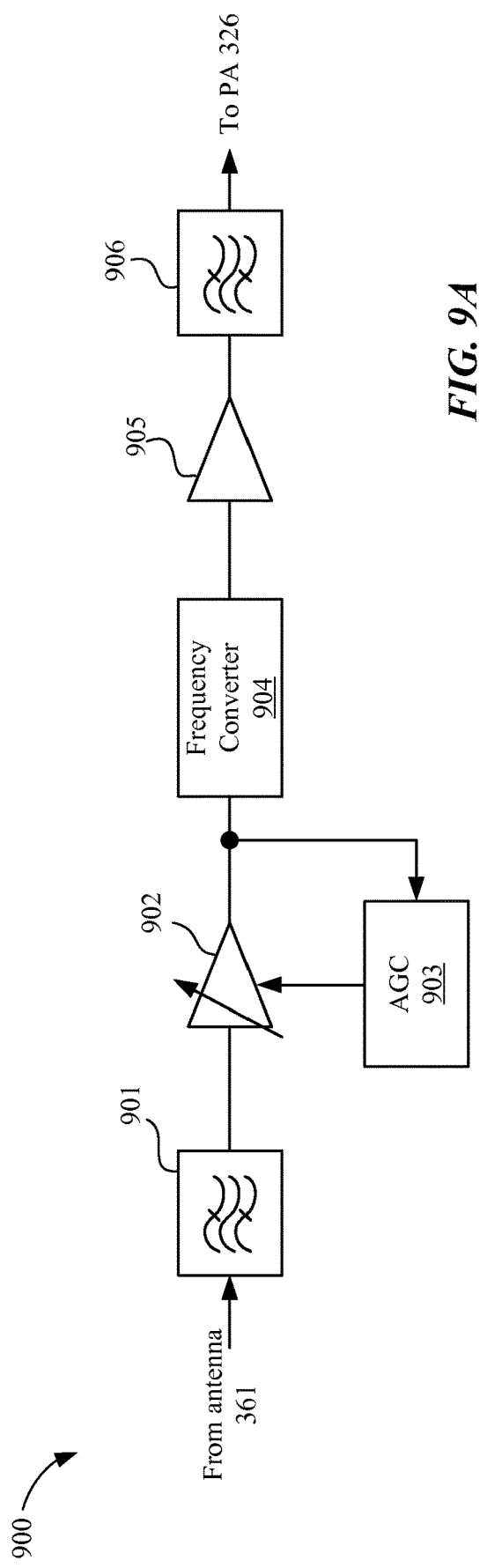
FIG. 9A shows a block diagram of an example return path of a return transponder in accordance with some implementations.

FIG. 9A shows an example return path 900 that may be one implementation of one or more of the return paths RP(1)-RP(8) of return transponder 600 of FIG. 6. Return path 900 is shown to include a first bandpass filter 901, a variable gain amplifier (VGA) 902, an automatic gain controller (AGC) 903, frequency converter 904, an amplifier 905, and a second bandpass filter 906. An example operation of return path 900 is described below with respect to channel 701, for example, as depicted in FIGS. 8A and 8B. It is to be understood, however, that return path 900 may be used to filter, frequency-convert, and amplify any of the different frequency channels 701-708 associated with satellite 300.

The first bandpass filter 901 may be used to limit frequencies of data signals entering return path 900 to frequencies associated with channel 701 of FIG. 8A. The VGA 902 may amplify the band-limited data signals received from the first bandpass filter 901. The gain settings for VGA 902 may be determined and/or adjusted by the AGC 903, as discussed in greater detail below. Signals amplified by VGA 902 are provided to frequency converter 904, which may modify the carrier frequency of a communication signal. For example, data signals transmitted from UTs 400 may have a carrier frequency within the $K_u$ band, and the frequency converter 904 may convert the received data signals to frequencies within the $K_a$ band, for example, using a local oscillator signal LO(R) (or any other clock or oscillating signal suitable for frequency conversion).

Signals output from the frequency converter 904 may be amplified by amplifier 905 and then filtered by second bandpass filter 906. The second bandpass filter 906 may limit output frequencies from frequency converter 904 to frequencies within the example channel 701. Signals output from second bandpass filter 906 may be provided to the PA 326 (see also FIG. 6).

For some implementations, the first bandpass filter 901 may be one or more of the first bandpass filters 321(1)-321(N) of FIG. 3, the frequency converter 904 may be one or more of the frequency converters 323(1)-323(N) of FIG. 3, the amplifier 905 may be one or more of the LNAs 324(1)-324(N) of FIG. 3, and the second bandpass filter 906 may be one or more of the second bandpass filters 325(1)-325(N) of FIG. 3. For other implementations, the processing order of second bandpass filter 906 and amplifier 905 may be switched. Thus, for another implementation, signals output from frequency converter 904 may be filtered by second bandpass filter 906 and then amplified by amplifier 905.

In accordance with example implementations, the AGC 903 may modify one or more gain settings of VGA 902 to increase the signal strengths associated with sub-channels 701A-701E, for example, so that the power levels or signal strengths of data signals transmitted from UTs 400A-400E are all greater than noise threshold 880 (see also FIG. 8A). For some implementations, the difference in signal strengths associated with the time-frequency sub-channels 701-701E may be less than a selected or predetermined amount (e.g., the signal strengths associated with the time-frequency sub-channels 701A-701E may be within a given range), which in turn may allow the gain provided by VGA 902 to be limited to a selected, predetermined, or threshold level (e.g., that does not overload signal processing circuits in the return path 900, especially the final power amplifier 326 which must pass all the combined signals).

For at least some implementations, the gain setting of VGA 902 may be based, at least in part, on combined power level of all data signals that occupy all the time-frequency sub-channels 701A-701E within the frequency channel 701. For example, if each of the sub-channels 701A-701E is capable of delivering a predetermined amount of power $P_{sch}=X$ mW to return path 900, then the total amount of power expected at the output of VGA 902 may be expressed as $P_{total}=5X$ mW. Thus, if the total output power of VGA 902 is less than 5X mW, as detected by the AGC 903, then the AGC 903 may increase the gain setting of VGA 902. Increasing the gain setting of VGA 902 may increase the total output power $P_{total}$ of VGA 902, which in turn may increase the power of all the time-frequency sub-channels 701A-701E to a level that exceeds the noise threshold 880.

The total output power of VGA 902 may be continuously (e.g., periodically) monitored by AGC 903 to determine whether the total output power of VGA 902 exceeds the threshold level. For example, if the AGC 903 determines that the total output power of VGA 902 is less than the threshold level, then the AGC 903 may further increase the gain of VGA 902. Conversely, if the AGC 903 determines that the total output power of VGA 902 is at (or near) the threshold level, then the AGC 903 may maintain the current gain settings of VGA 902. In addition, if the AGC 903 determines that the total output power of VGA 902 is greater than the threshold level (e.g., which may degrade and/or overdrive one or more downstream signal processing circuits in the return path 900), then the AGC 903 may reduce the gain settings of VGA 902. In one implementation, amplifier gain adjustments provided by AGC 903 may be on the order of 1 microsecond. For some aspects, amplifier gain adjustments may be provided by AGC 903 at the beginning of a number of adjustment intervals 821, for example, to account for the time-shared nature of the time-frequency sub-channels within each of the different frequency channels 701-708 that form the return link between the UTs 400 and satellite 300. More specifically, as described above with respect to FIGS. 8A-8B, the adjustment intervals 821 may each have a duration or time period on the order of 1 millisecond, and the amplifier gain adjustments provided by AGC 903 may be on the order of 1 microsecond, for example, to quickly compensate for changes in signal strengths of the time-frequency sub-channels between successive time slots, which as mentioned above, may be one millisecond in duration. Thus, even if one or more of UTs 400 were to provide gain adjustments in response to decreases in the uplink path gain, such gain adjustments may take many milliseconds to correct the uplink gain loss (e.g., to increase the uplink path gain to a suitable level). Accordingly, because the gain adjustments provided by AGC 903 may be on the order of 1 microsecond (which may be several orders of magnitude faster than the UTs 400 may make gain adjustments), the gain adjustments provided by AGC 903 may prevent a rapid decrease in uplink path gain loss, for example, until gain adjustments provided by UTs 400 are able to restore the uplink path gain to its nominal level.

For example, if each of the time-frequency sub-channels may be expected to deliver 100 mW to return path 900, and return path 900 is configured to receive five time-frequency sub-channels of a given one of frequency channels 701-708, then AGC 903 may be configured to increase the gain setting of VGA 902 when the output power of VGA 902 falls below 500 mW. More specifically, if AGC 903 determines that the VGA output power is less than 500 mW, then AGC 903 may increase the gain setting of VGA 902. Conversely, if AGC 903 determines that the VGA output power is greater than 500 mW, then AGC 903 may decrease the gain setting of VGA 902. In some implementations, hysteresis may be used to reduce VGA gain setting adjustments in response to transient changes in the total output power of VGA 902. These changes may occur in microseconds as noted above.

Referring also to FIG. 8B, the signal strength of time-frequency sub-channel 701A almost instantaneously decreases from a level above noise threshold 880 to a level below noise threshold 880 between time slots 800 and 801. In response thereto, the AGC 903 may, at the beginning of adjustment interval 821(1), increase the gain setting of VGA 902 to increase the power level of the time-frequency sub-channel 701A (as well as the power levels of the other time-frequency sub-channels 701B-701E within the frequency channel 701). When the signal strength of time-frequency sub-channel 701A almost instantaneously increases from a level below noise threshold 880 to a level above noise threshold 880 between time slots 801 and 802, the AGC 903 may, at the beginning of adjustment interval 821(2), decrease the gain setting of VGA 902 to decrease the power level of the time-frequency sub-channel 701A (as well as the power levels of the other time-frequency sub-channels 701B-701E within the frequency channel 701). Then, when the signal strength of time-frequency sub-channel 701A almost instantaneously decreases from a level above noise threshold 880 to a level below noise threshold 880 between time slots 802 and 803, the AGC 903 may, at the beginning of adjustment interval 821(3), increase the gain setting of VGA 902 to increase the power level of the time-frequency sub-channel 701A (as well as the power levels of the other time-frequency sub-channels 701B-701E within the frequency channel 701). Lastly, when the signal strength of time-frequency sub-channel 701A almost instantaneously increases from a level below noise threshold 880 to a level above noise threshold 880 between time slots 803 and 804, the AGC 903 may, at the beginning of adjustment interval 821(4), decrease the gain setting of VGA 902 to decrease the power level of the time-frequency sub-channel 701A (as well as the power levels of the other time-frequency sub-channels 701B-701E within the frequency channel 701).

Figure 9B:
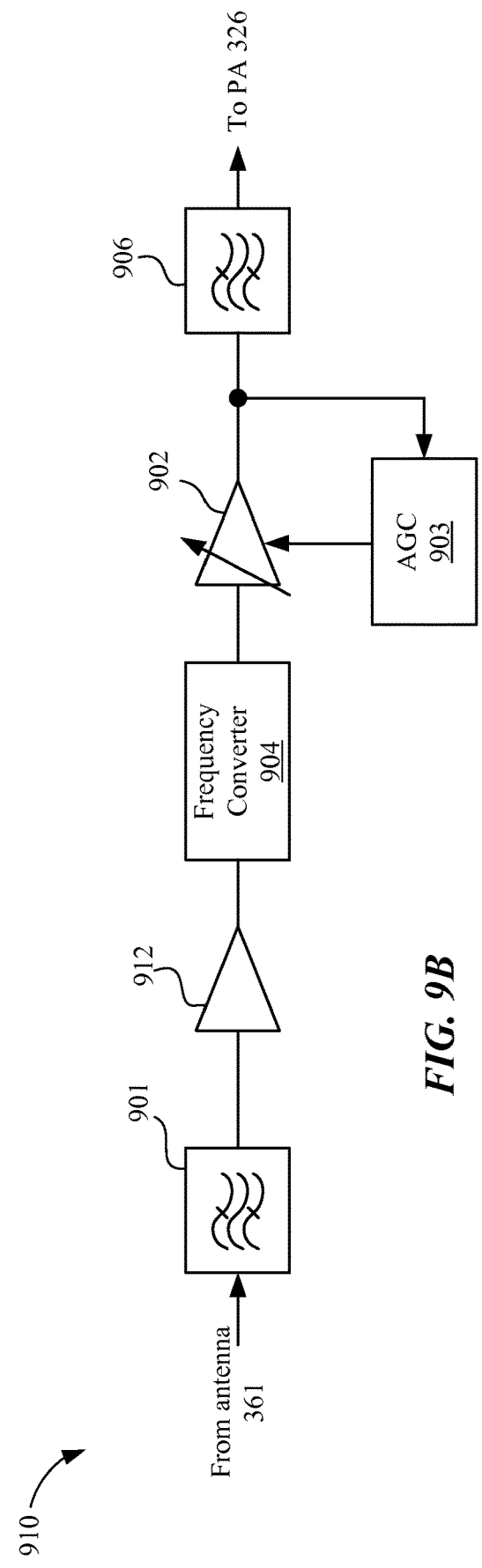
FIG. 9B shows a block diagram of an example return path of a return transponder in accordance with other implementations.

FIG. 9B shows an example return path 910 that may be one implementation of one or more of the return paths RP(1)-RP(8) of return transponder 600 of FIG. 6. Return path 910 similar to return path 900 of FIG. 9A, except that the VGA 902 is coupled between frequency converter 904 and bandpass filter 906, and an LNA 912 is coupled between bandpass filter 901 and frequency converter 904.

Figure 10:
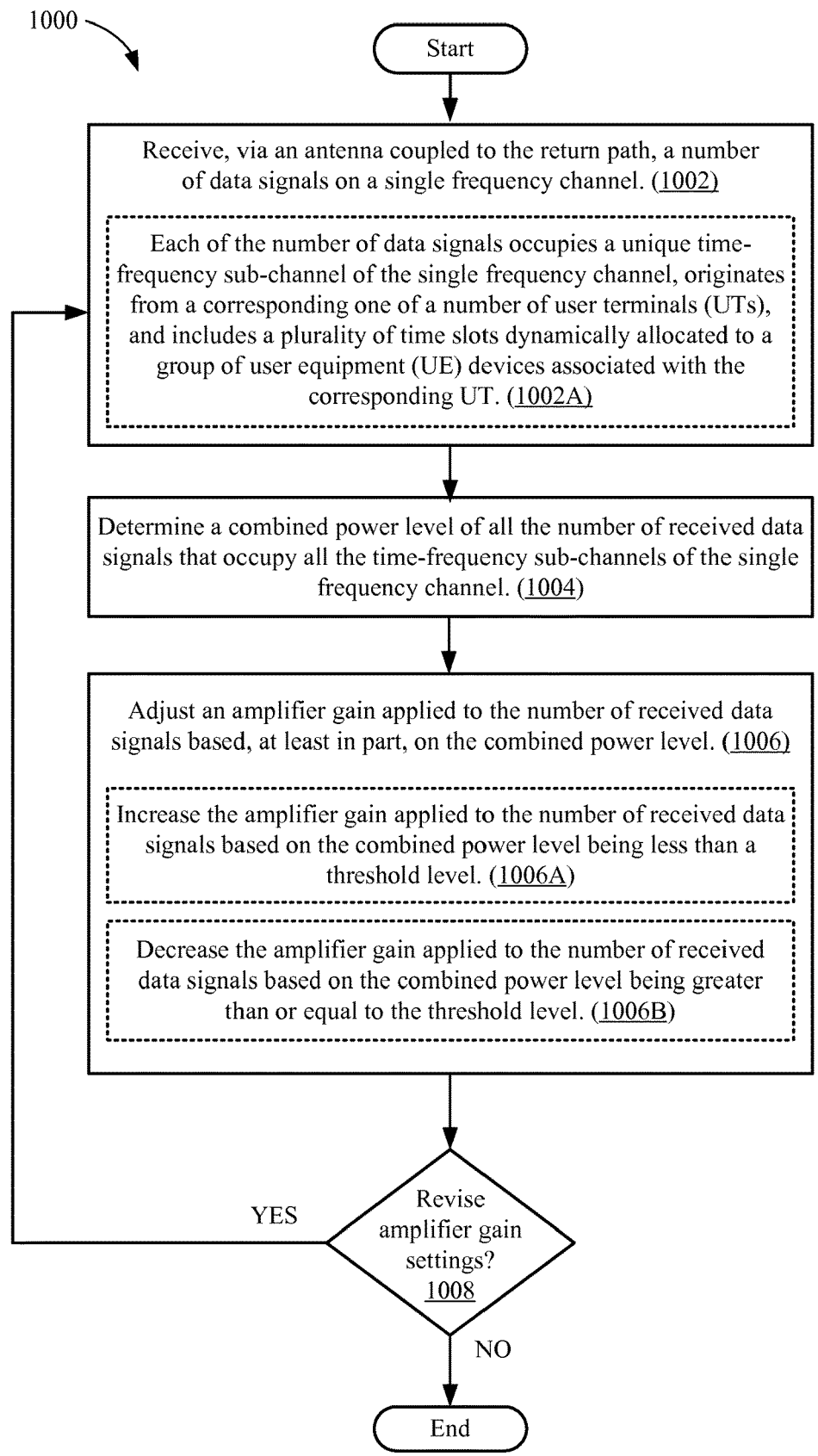
FIG. 10 shows an illustrative flow chart depicting an exemplary operation for adjusting gain settings.

FIG. 10 shows an illustrative flow chart depicting an example operation 1000 for adjusting gain settings for return path 900, in accordance with some implementations. Referring also to FIGS. 6, 7, 8A-8B, and 9A, the return path 900 receives, via an antenna coupled to the return path, a number of data signals on a single frequency channel (1002). For some implementations, the number of data signals may be received from a number of user terminals UTs 400A-400E each assigned a corresponding one of the time-frequency sub-channels 701A-701E, respectively, within the single frequency channel 701. More specifically, each of the number of data signals occupies a unique time-frequency sub-channel of the single frequency channel, originates from a corresponding one of a number of UTs 400, and includes a plurality of time slots dynamically allocated to a group of UE devices 500 associated with the corresponding UT 400 (1002A). For example, frequency channel 701 may be assigned to return path 900, and the time-frequency sub-channels 701A-701E of frequency channel 701 may be assigned to UTs 400A-400E, respectively. Further, each group 501 of UE devices 500 shares the plurality of time slots of the time-frequency sub-channel that is assigned to the UT 400 associated with the group 501 of UE devices 500. For example, the UE devices 500A-1 to 500A-n within UE group 501A may share the first time-frequency sub-channel 701A assigned to UT 400A, the UE devices 500B-1 to 500B-n within UE group 501B may share the second time-frequency sub-channel 701B assigned to UT 400B, and so on.

Next, a combined power level of all the number of received data signals that occupy all the time-frequency sub-channels within the single frequency channel is determined (1004). For some implementations, AGC 903 may determine the combined power level of all the time-frequency sub-channels within the single frequency channel based on the output power of the VGA 902 (or alternatively based on the current gain settings of the VGA 902).

Next, an amplifier gain applied to all the number of received data signals is adjusted based, at least in part, on the combined power level of all the time-frequency sub-channels within the single frequency channel (1006). For some implementations, the AGC 903 may measure the output power of the VGA 902, and selectively adjust the amplifier gain settings in response thereto. For other implementations, the AGC 903 or any other suitable circuit (e.g., a voltage detector, a comparator, and the like) may be used to determine the combined power level of all the time-frequency sub-channels within the single frequency channel.

Referring again to FIG. 10, for at least some example implementations, the amplifier gain applied to the number of received data signals may be increased based on the combined power level of all the time-frequency sub-channels within the single frequency channel being less than the threshold level (1006A), and the amplifier gain applied to the number of received data signals may be decreased based on the combined power level of all the time-frequency sub-channels within the single frequency channel being greater than the threshold level (1006B). In some aspects, the determined combined power level being less than the threshold level may be indicative of a signal-to-noise ratio (SNR) of at least one of the time-frequency sub-channels being relatively low (e.g., the power level of at least one of the time-frequency sub-channels being less than noise threshold 880 of FIG. 8A).

Next, a determination may be made as to whether the amplifier gain settings are to be revised (1008). For example, if the AGC 903 determines that the application of the amplifier gain settings results in the combined power level of all the time-frequency sub-channels within the single frequency channel being less than the threshold level, then processing may continue at 1004. Otherwise, processing may end.

Figure 11:
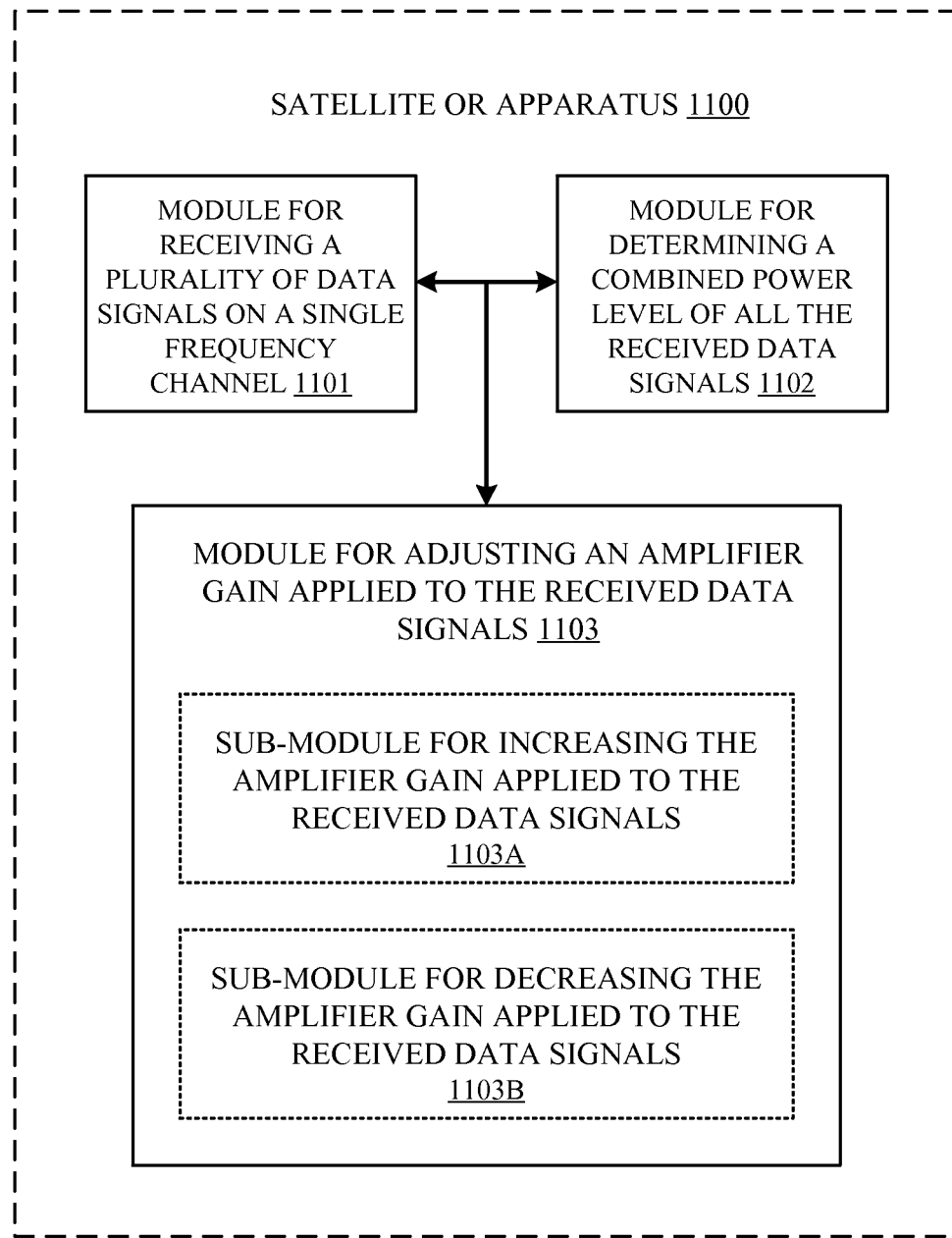
FIG. 11 shows a block diagram of several sample aspects of apparatuses configured to support controlling satellite operations as taught herein.

FIG. 11 shows an example satellite or apparatus 1100 represented as a series of interrelated functional modules. A module 1101 for receiving a number of data signals on a single frequency channel may correspond at least in some aspects to, for example, a processor as discussed herein (e.g., processor 630) and/to one or more antennas as discussed herein (e.g., one or more of antennas 361). A module 1102 for determining a combined power level of the number of received data signals may correspond at least in some aspects to, for example, a processor as discussed herein (e.g., processor 630) and/to an ACG as discussed herein (e.g., AGC 903). A module 1103 for adjusting an amplifier gain applied to the number of received data signals may correspond at least in some aspects to, for example, a processor as discussed herein (e.g., processor 630) and/to an ACG as discussed herein (e.g., AGC 903).

For some implementations, the module 1103 may include a sub-module 1103A for increasing the amplifier gain applied to the number of received data signals that may correspond at least in some aspects to, for example, a processor as discussed herein (e.g., processor 630) and/to an ACG as discussed herein (e.g., AGC 903). The module 1103 may include a sub-module 1103B for decreasing the amplifier gain applied to the number of received data signals that may correspond at least in some aspects to, for example, a processor as discussed herein (e.g., processor 630) and/to an ACG as discussed herein (e.g., AGC 903).

The functionality of the modules of FIG. 11 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 11, as well as other components and functions described herein, may be implemented using any suitable means. Such means also may be implemented, at least in part, using corresponding structure as taught herein. For example, the components described above in conjunction with the "module for" components of FIG. 11 also may correspond to similarly designated "means for" functionality. Thus, in some aspects one or more of such means may be implemented using one or more of processor components, integrated circuits, or other suitable structure as taught herein.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, one aspect of the disclosure can include a non-transitory computer readable media embodying a method for time and frequency synchronization in non-geosynchronous satellite communication systems. The term "non-transitory" does not exclude any physical storage medium or memory and particularly does not exclude dynamic memory (e.g., conventional random access memory (RAM)) but rather excludes only the interpretation that the medium can be construed as a transitory propagating signal.

While the foregoing disclosure shows illustrative aspects, it should be noted that various changes and modifications could be made herein without departing from the scope of the appended claims. The functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated. Accordingly, the disclosure is not limited to the illustrated examples and any means for performing the functionality described herein are included in aspects of the disclosure.

What is claimed is:

1. A method for processing communication signals in a return path of a satellite, the method comprising:
    receiving, via an antenna coupled to the return path, a number of data signals on a single frequency channel, wherein each of the number of data signals occupies a unique time-frequency sub-channel of the single frequency channel, originates from a corresponding one of a number of user terminals (UTs), and includes a plurality of time slots dynamically allocated to a group of user equipment (UE) devices associated with the corresponding UT;
    determining, in the satellite, a combined power level of all of the number of received data signals that occupy all the time-frequency sub-channels of the single frequency channel; and
    adjusting an amplifier gain of at least one amplifier in the satellite that amplifies the number of received data signals in the return path based, at least in part, on the combined power level of all of the number of received data signals that occupy all the time-frequency sub-channels of the single frequency channel.

2. The method of claim 1, wherein the satellite comprises a bent pipe satellite in a non-geosynchronous orbit (NGSO) around Earth.

3. The method of claim 1, wherein adjustment of the amplifier gain is to compensate for differences in signal strengths between the time-frequency sub-channels of the single frequency channel.

4. The method of claim 1, wherein the amplifier gain is selectively adjusted at intervals having a time period equal to a duration of the time slots.

5. The method of claim 1, wherein each of the number of UTs is assigned to a corresponding one of the unique time-frequency sub-channels.

6. The method of claim 1, wherein the adjusting comprises:
    increasing the amplifier gain applied to the number of received data signals based on the combined power level being less than a threshold level; and decreasing the amplifier gain applied to the number of received data signals based on the combined power level being greater than or equal to the threshold level.

7. The method of claim 6, wherein the threshold level corresponds to a maximum power level of a variable gain amplifier in the return path of the satellite.

8. The method of claim 6, wherein the combined power level being less than the threshold level is indicative of a signal-to-noise ratio (SNR) of at least one of the unique time-frequency sub-channels being less than a threshold SNR value.

9. The method of claim 1, wherein the number of data signals are received without a pilot signal on the single frequency channel.

10. A satellite, comprising:
an antenna configured to receive a number of data signals on a single frequency channel, wherein each of the number of data signals occupies a unique time-frequency sub-channel of the single frequency channel, originates from a corresponding one of a number of user terminals (UTs), and includes a plurality of time slots dynamically allocated to a group of user equipment (UE) devices associated with the corresponding UT;
one or more processors; and
a memory configured to store instructions that, when executed by the one or more processors, causes a return path of the satellite to:
determine, in the satellite, a combined power level of all of the number of received data signals that occupy all the time-frequency sub-channels of the single frequency channel; and
adjust an amplifier gain of at least one amplifier in the satellite that amplifies the number of received data signals in the return path based, at least in part, on the combined power level of all of the number of received data signals that occupy all the time-frequency sub-channels of the single frequency channel.

11. The satellite of claim 10, wherein the satellite comprises a bent pipe satellite in a non-geosynchronous orbit (NGSO) around Earth.

12. The satellite of claim 10, wherein adjustment of the amplifier gain is to compensate for differences in signal strengths between the time-frequency sub-channels of the single frequency channel.

13. The satellite of claim 10, wherein the amplifier gain is adjusted at intervals having a time period equal to a duration of the time slots.

14. The satellite of claim 10, wherein each of the number of UTs is assigned to a corresponding one of the unique time-frequency sub-channels.

15. The satellite of claim 10, wherein execution of the instructions to adjust the amplifier gain causes the return path to:
increase the amplifier gain based on the combined power level being less than a threshold level; and
decrease the amplifier gain based on the combined power level being greater than or equal to the threshold level.

16. The satellite of claim 15, wherein the threshold level corresponds to a maximum power level of a variable gain amplifier (VGA) associated with the return path.

17. The satellite of claim 15, wherein the combined power level being less than the threshold level is indicative of a signal-to-noise ratio (SNR) of at least one of the unique time-frequency sub-channels being less than a threshold SNR value.

18. The satellite of claim 10, wherein the number of data signals are received without a pilot signal on the single frequency channel.

19. A satellite including a number of return paths, a respective one of the number of return paths comprising:
means for receiving a number of data signals on a single frequency channel, wherein each of the number of data signals occupies a unique time-frequency sub-channel of the single frequency channel, originates from a corresponding one of a number of user terminals (UTs), and includes a plurality of time slots dynamically allocated to a group of user equipment (UE) devices associated with the corresponding UT;
means for determining, in the satellite, a combined power level of all of the number of received data signals that occupy all the time-frequency sub-channels of the single frequency channel; and
means for adjusting an amplifier gain of at least one amplifier in the satellite that amplifies the number of received data signals in the respective return path based, at least in part, on the combined power level of all of the number of received data signals that occupy all the time-frequency sub-channels of the single frequency channel.

20. The satellite of claim 19, wherein adjustment of the amplifier gain is to compensate for differences in signal strengths between the time-frequency sub-channels of the single frequency channel.

21. The satellite of claim 19, wherein the amplifier gain is selectively adjusted at intervals having a time period equal to a duration of the time slots.

22. The satellite of claim 19, wherein the means for adjusting is to:
increase the amplifier gain applied to the number of received data signals based on the combined power level being less than a threshold level; and
decrease the amplifier gain applied to the number of received data signals based on the combined power level being greater than or equal to the threshold level.

23. The satellite of claim 22, wherein the threshold level corresponds to a maximum power level associated with the respective return path of the satellite.

24. The satellite of claim 19, wherein the number of data signals are received without a pilot signal on the single frequency channel.

25. A non-transitory computer-readable medium storing instructions that, when executed by one or more processors of a satellite, cause a return path of the satellite to:
receive a number of data signals on a single frequency channel, wherein each of the number of data signals occupies a unique time-frequency sub-channel of the single frequency channel, originates from a corresponding one of a number of user terminals (UTs), and includes a plurality of time slots dynamically allocated to a group of user equipment (UE) devices associated with the corresponding UT;
determine, in the satellite, a combined power level of all of the number of received data signals that occupy all the time-frequency sub-channels of the single frequency channel; and
adjust an amplifier gain of at least one amplifier in the satellite that amplifies the number of received data signals in the return path based, at least in part, on the combined power level of all of the number of received data signals that occupy all the time-frequency sub-channels of the single frequency channel.

26. The non-transitory computer-readable medium of claim 25, wherein adjustment of the amplifier gain is to compensate for differences in signal strengths between the time-frequency sub-channels of the single frequency channel.

27. The non-transitory computer-readable medium of claim 25, wherein execution of the instructions causes the return path to selectively adjust the amplifier gain at intervals having a time period equal to a duration of the time slots.

28. The non-transitory computer-readable medium of claim 25, wherein execution of the instructions to selectively adjust the amplifier gain causes the return path to:
   increase the amplifier gain applied to the number of received data signals based on the combined power level being less than a threshold level; and
   decrease the amplifier gain applied to the number of received data signals based on the combined power level being greater than or equal to the threshold level.

29. The non-transitory computer-readable medium of claim 28, wherein the threshold level corresponds to a maximum power level associated with the return path of the satellite.

30. The non-transitory computer-readable medium of claim 25, wherein the number of data signals are received without a pilot signal on the single frequency channel.

* * * * *